US012634386B2

(12) United States Patent
Sun et al.

(10) Patent No.: US 12,634,386 B2
(45) Date of Patent: May 19, 2026

(54) DISTRIBUTED CALL CONFLICT PROCESSING METHOD AND SYSTEM, ELECTRONIC DEVICE, AND STORAGE MEDIUM

(71) Applicant: Honor Device Co., Ltd., Shenzhen (CN)

(72) Inventors: Huiping Sun, Shenzhen (CN); Xin Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 321 days.

(21) Appl. No.: 18/579,072

(22) PCT Filed: Aug. 25, 2022

(86) PCT No.: PCT/CN2022/114933

§ 371 (c)(1),
(2) Date: Jan. 12, 2024

(87) PCT Pub. No.: WO2023/103462

PCT Pub. Date: Jun. 15, 2023

(65) Prior Publication Data

US 2024/0323268 A1     Sep. 26, 2024

(30) Foreign Application Priority Data

Dec. 8, 2021    (CN) .......................... 202111492320.X

(51) Int. Cl.
H04M 1/72484 (2021.01)
H04M 1/00 (2006.01)
H04M 1/72412 (2021.01)

(52) U.S. Cl.
CPC ....... *H04M 1/006* (2013.01); *H04M 1/72484* (2021.01); *H04M 1/72412* (2021.01)

(58) Field of Classification Search
CPC ..... H04M 1/006; H04M 3/46; H04M 1/72484
(Continued)

(56) References Cited

U.S. PATENT DOCUMENTS 6,141,556 A      10/2000  Dougherty et al.
8,108,832 B2 *   1/2012   Etelapera .................. G06F 8/65
                                                          717/121

(Continued)

FOREIGN PATENT DOCUMENTS

CN      104468962 A      3/2015
CN      204334714 U      5/2015
(Continued)

*Primary Examiner* — Jirapon Tulop
(74) *Attorney, Agent, or Firm* — Conley Rose, P.C.

(57)        ABSTRACT

A distributed call conflict processing method and system. A first electronic device is near-field connected to a second electronic device, the first electronic device is a device having a telephone call function, and the first electronic device has a first SIM card. The first electronic device receives an incoming call event from a calling party, and obtains an incoming call SIM card identifier in the incoming call event; if a status identifier of the first SIM card indicates that the first SIM card is occupied, and a status identifier of the second electronic device indicates that the second electronic device is occupied, the first electronic device sends the incoming call event to the second electronic device; and the second electronic device outputs a prompt of an incoming call conflict.

20 Claims, 25 Drawing Sheets

(58) Field of Classification Search
USPC ........................................................ 455/417
See application file for complete search history.

(56) References Cited

U.S. PATENT DOCUMENTS

| | | | | |
|---|---|---|---|---|
| 9,105,163 | B2 * | 8/2015 | Ashbrook | ............. H04M 19/04 |
| 9,351,137 | B2 * | 5/2016 | Kasilya Sudarsan | ........................ H04M 1/72412 |
| 2012/0057525 | A1 | 3/2012 | Hou | |
| 2014/0205076 | A1 * | 7/2014 | Kumar | ................ H04M 7/0033 379/142.01 |
| 2016/0057593 | A1 | 2/2016 | Shin et al. | |
| 2021/0076440 | A1 | 3/2021 | Qiu et al. | |
| 2022/0294891 | A1 | 9/2022 | Liu | |

FOREIGN PATENT DOCUMENTS

| | | | |
|---|---|---|---|
| CN | 105338178 | A | 2/2016 |
| CN | 105554291 | A | 5/2016 |
| CN | 108243398 | A | 7/2018 |
| CN | 109327621 | A | 2/2019 |
| CN | 109525717 | A | 3/2019 |
| CN | 110191241 | A | 8/2019 |
| CN | 111835907 | A | 10/2020 |
| CN | 112887926 | A | 6/2021 |
| CN | 113572731 | A | 10/2021 |
| JP | 2021145351 | A | 9/2021 |
| WO | 2013149398 | A1 | 10/2013 |

* cited by examiner

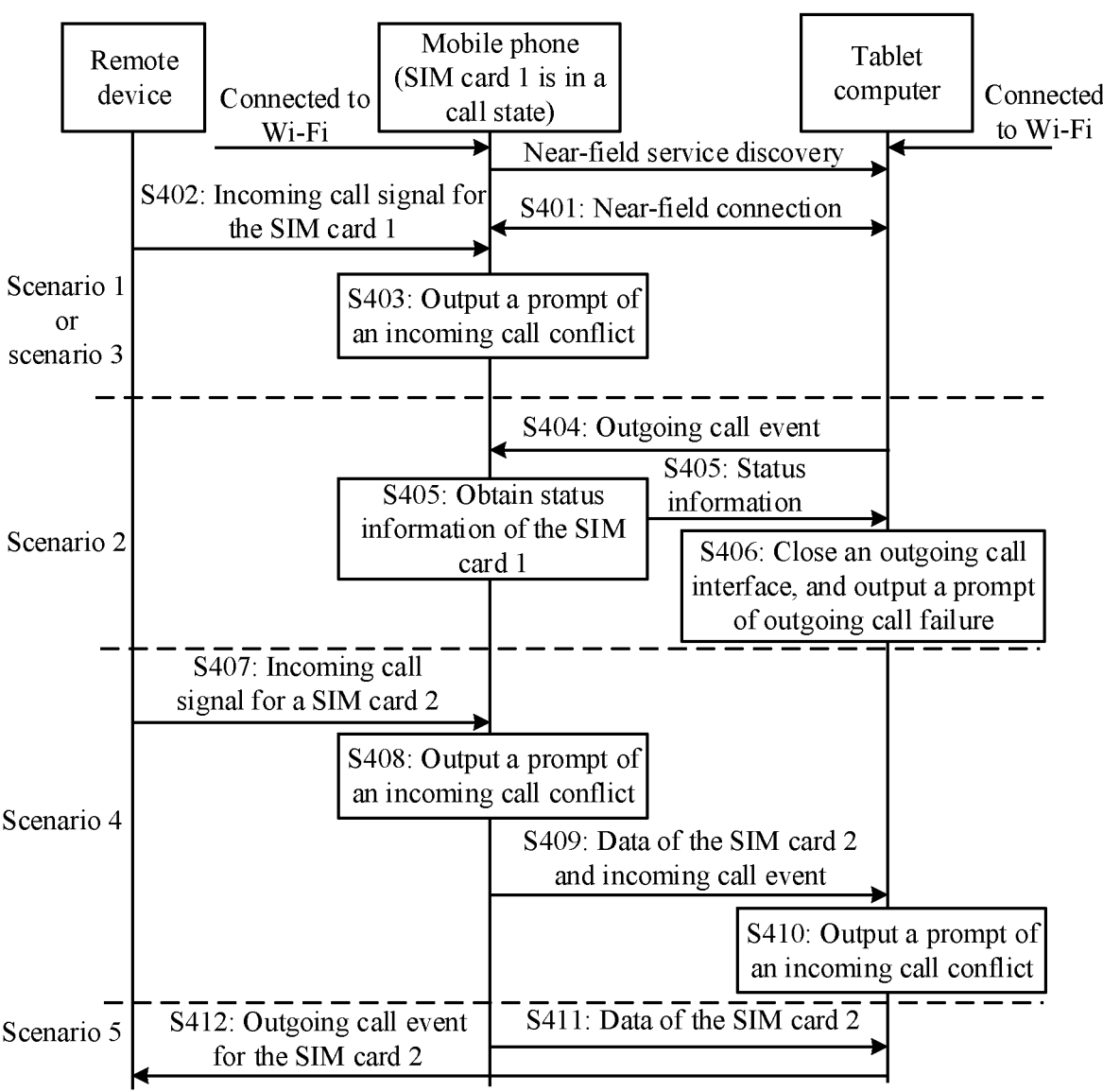
FIG. 4A1

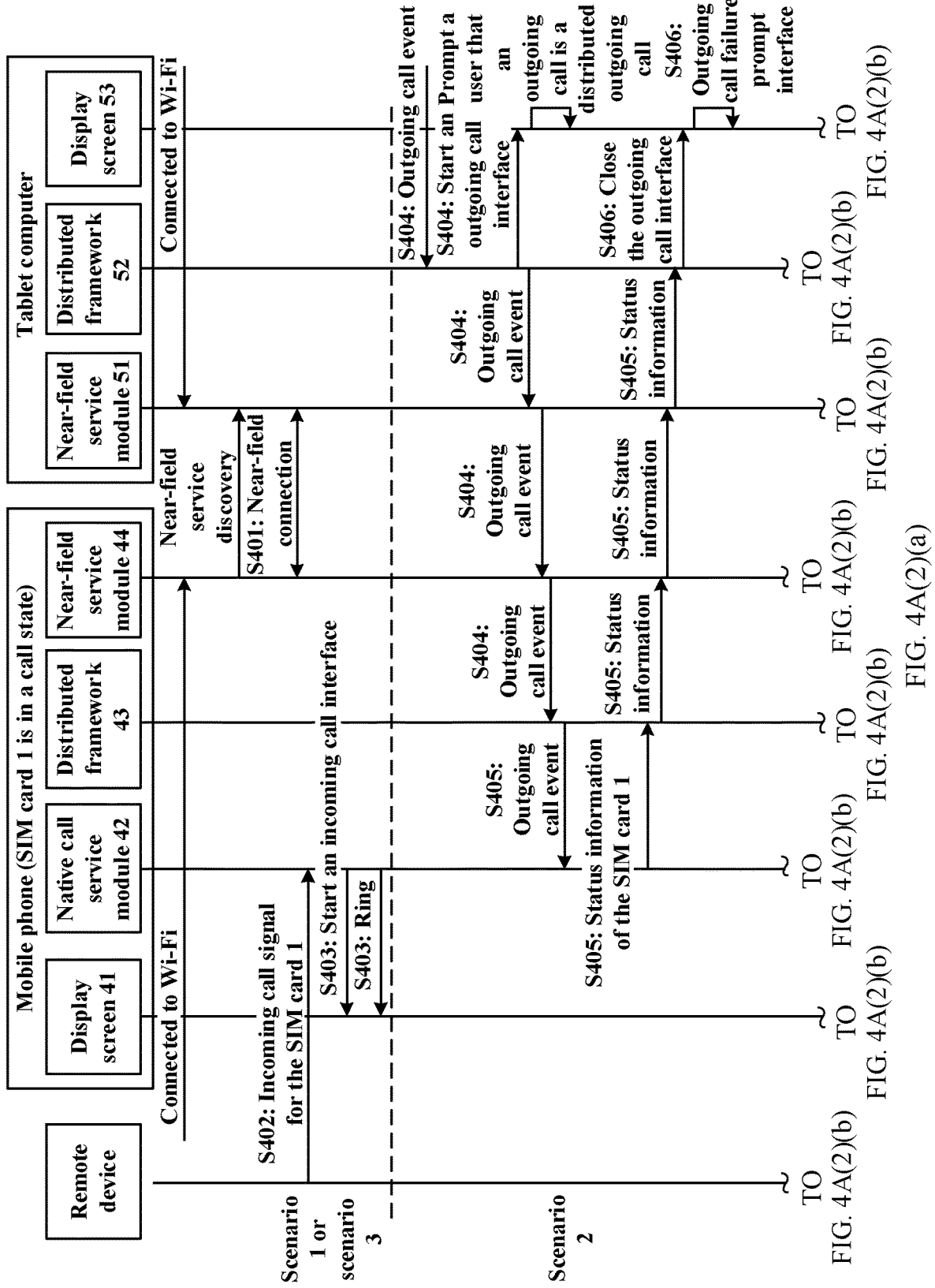

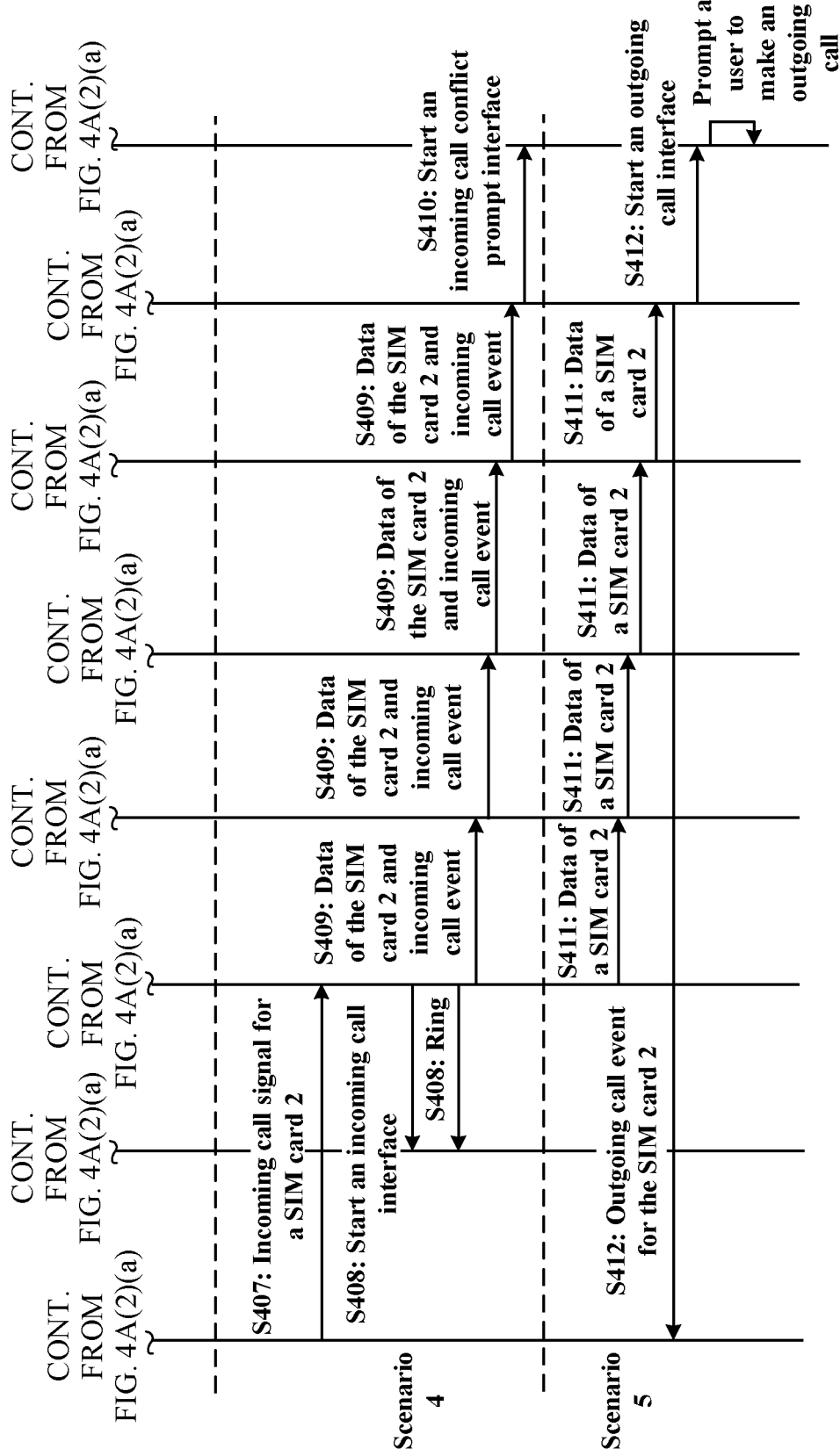
FIG. 4A(2)(b)

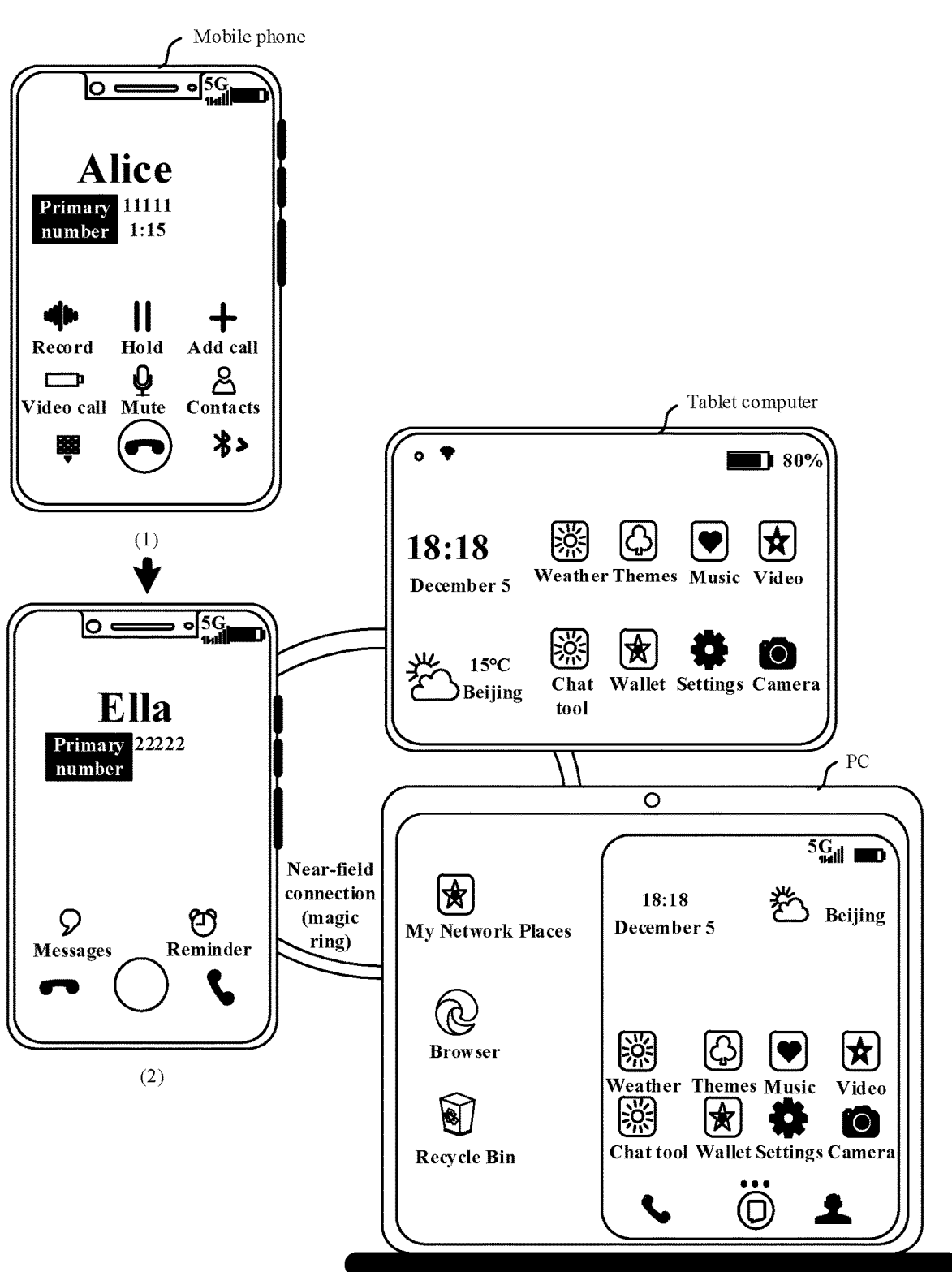
FIG. 4B1

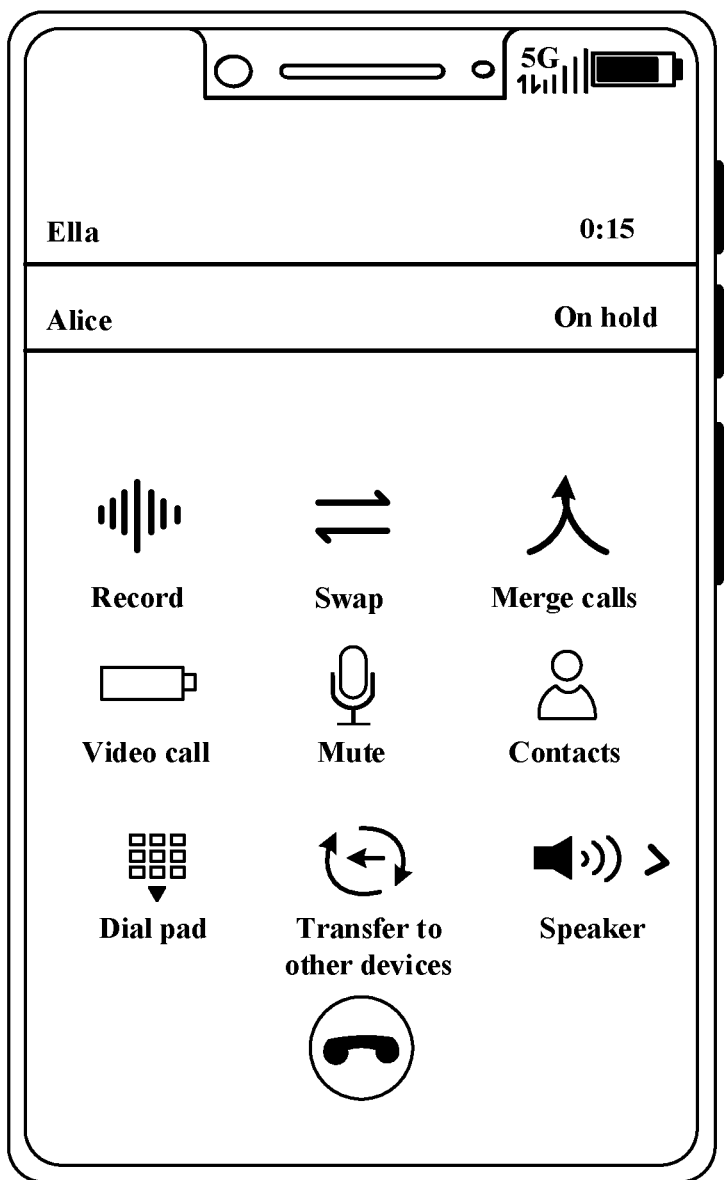
FIG. 4B2

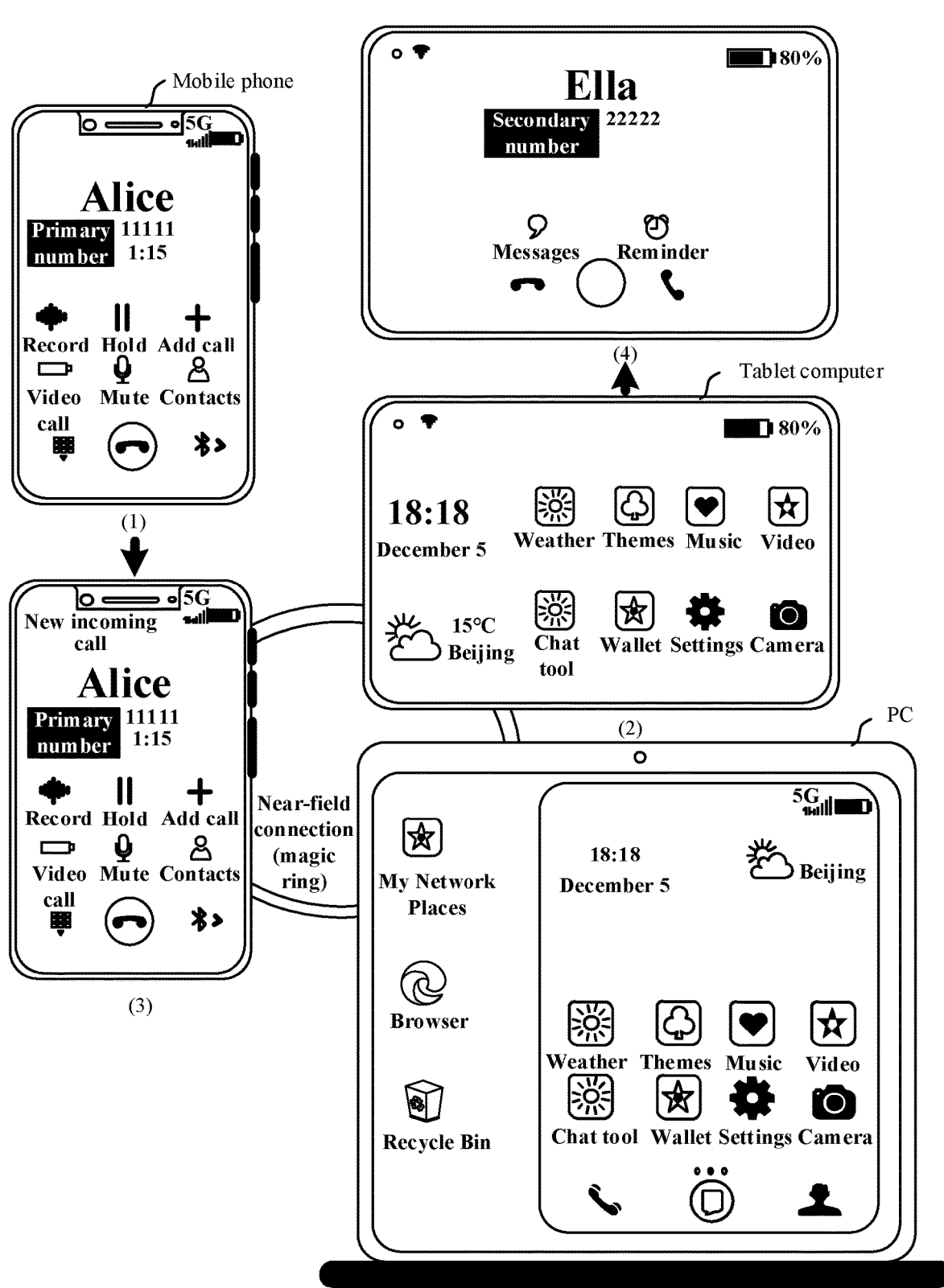
FIG. 4D1

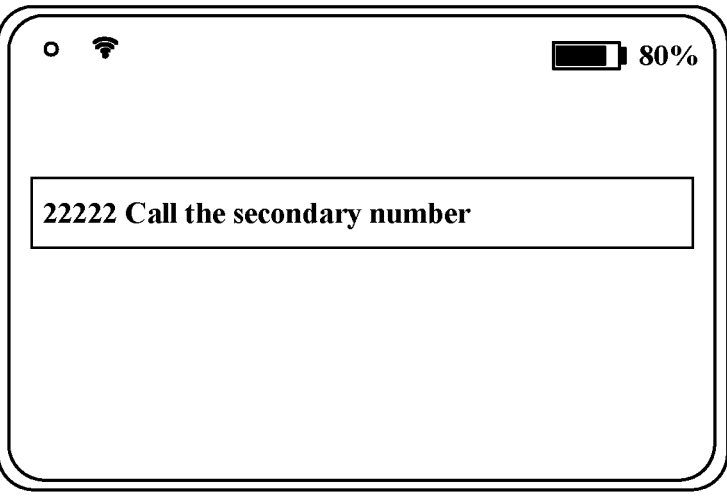
FIG. 4D2

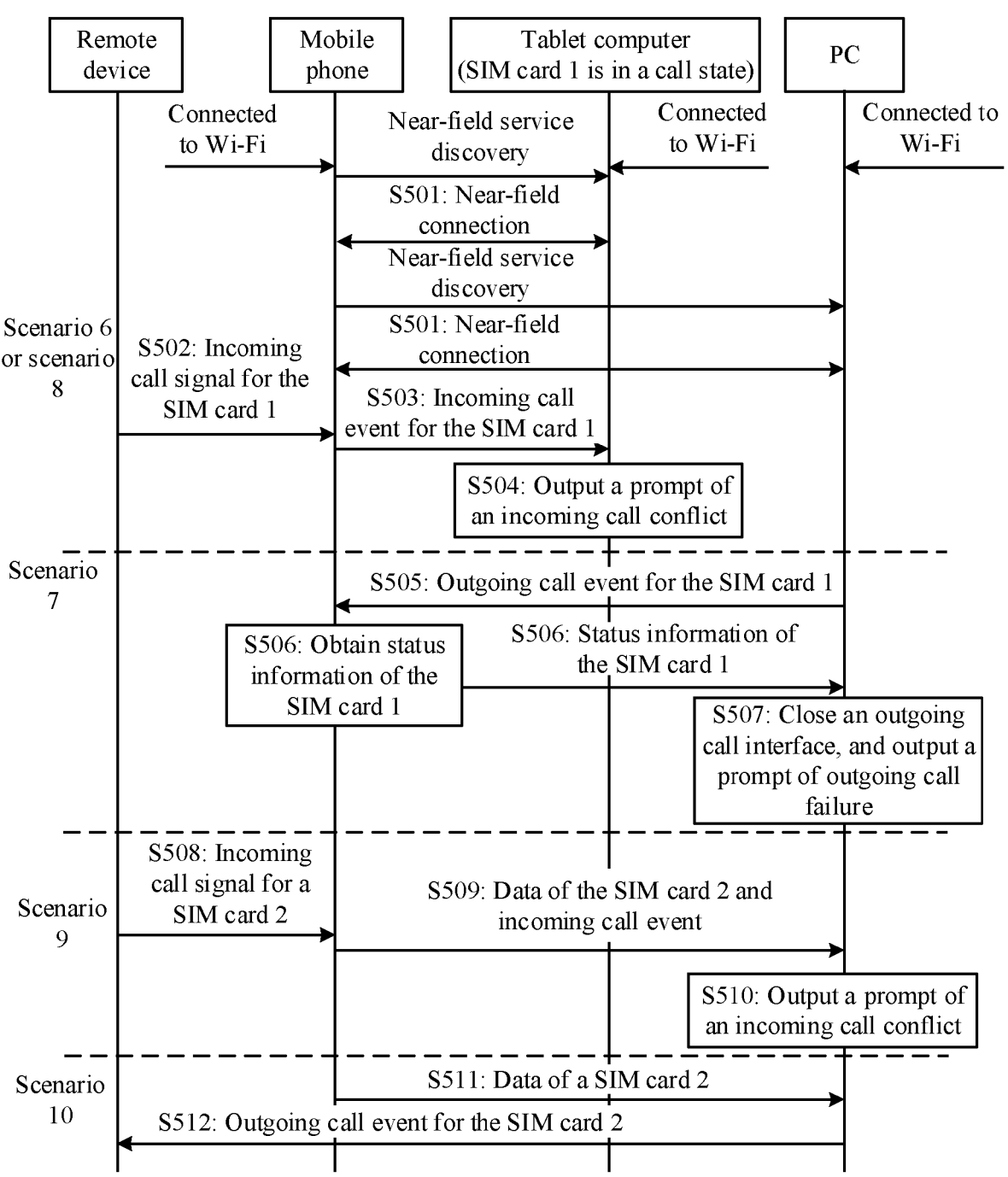
FIG. 5A1

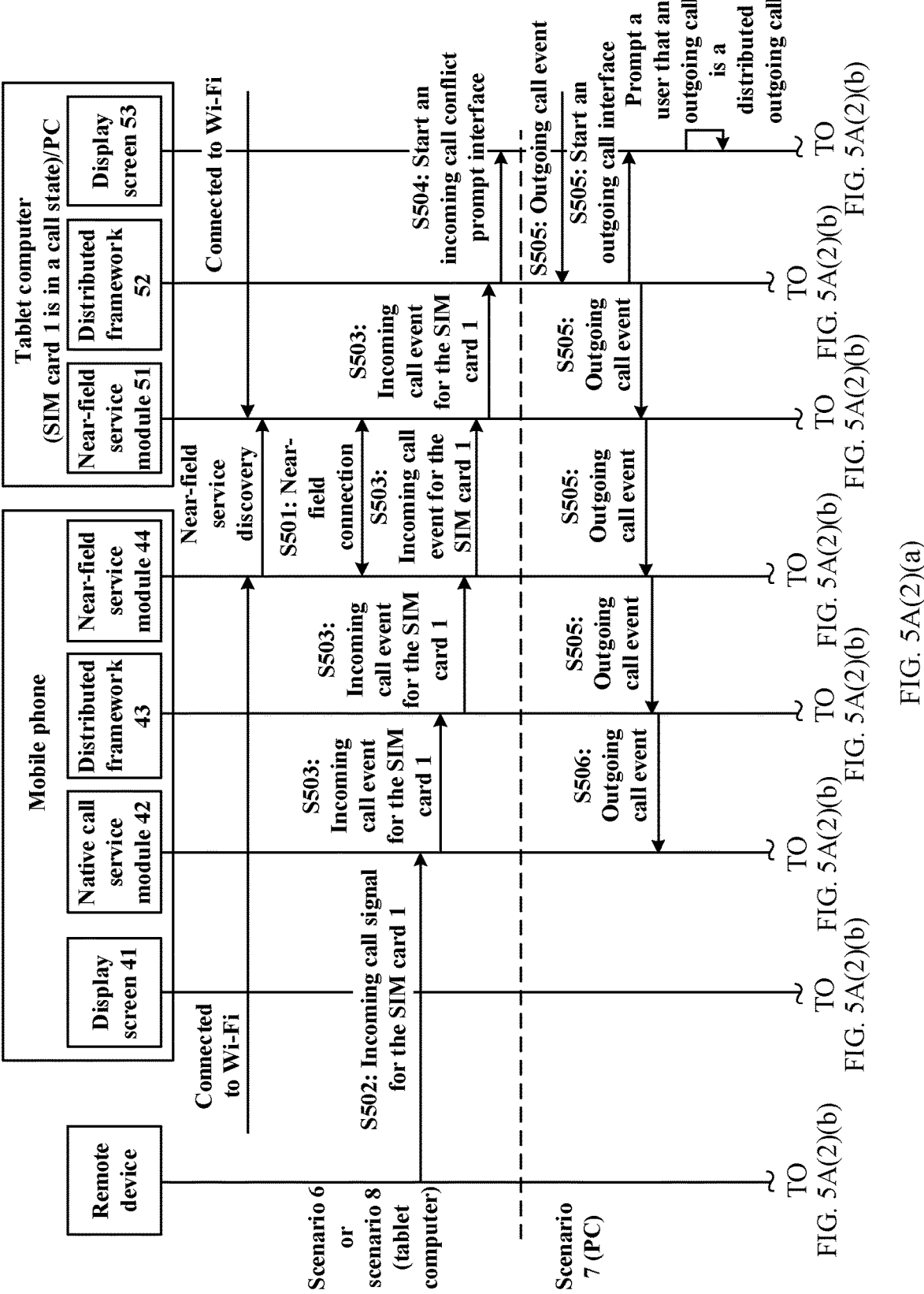
FIG. 5A(2)(a)

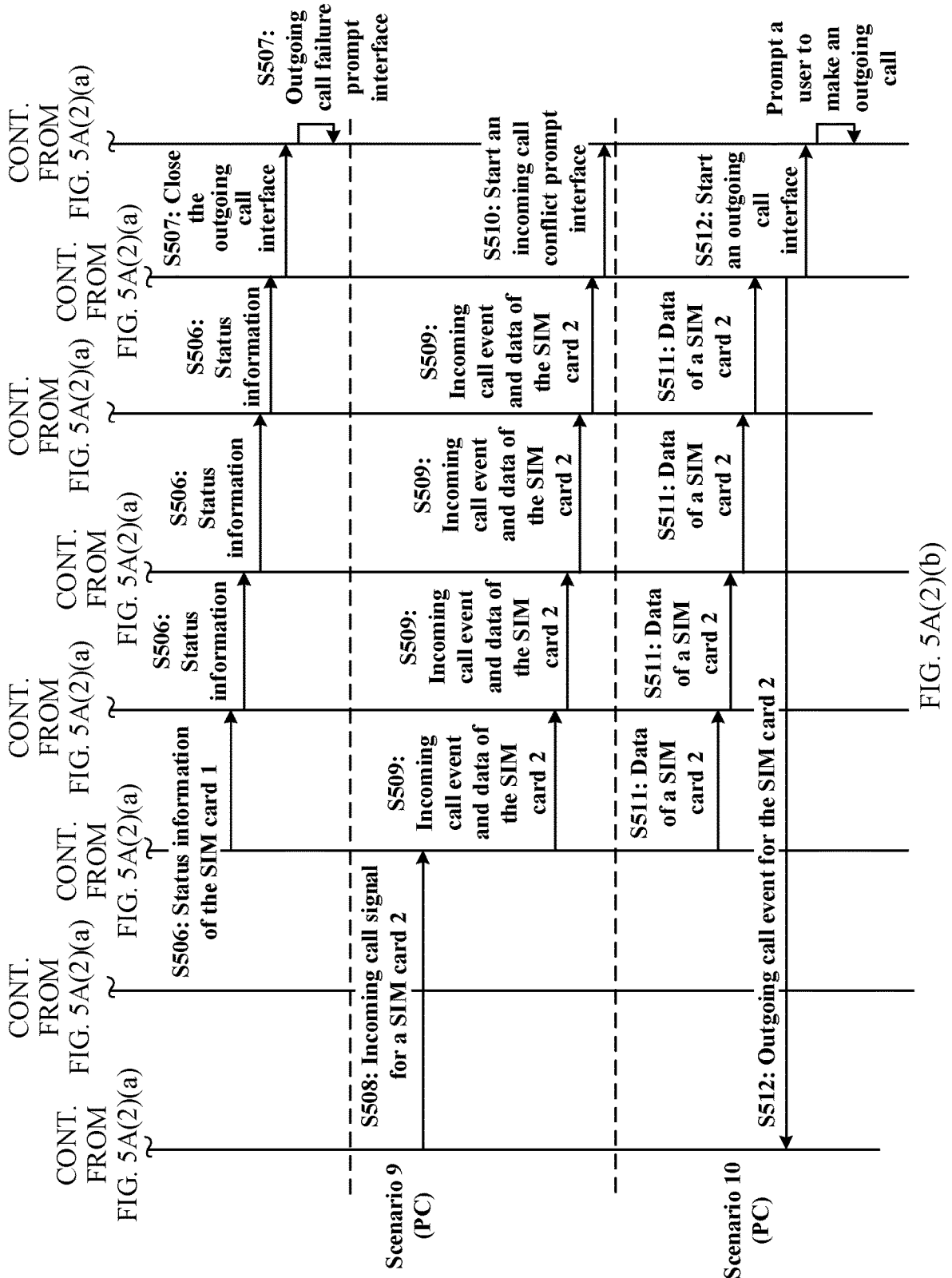
FIG. 5A(2)(b)

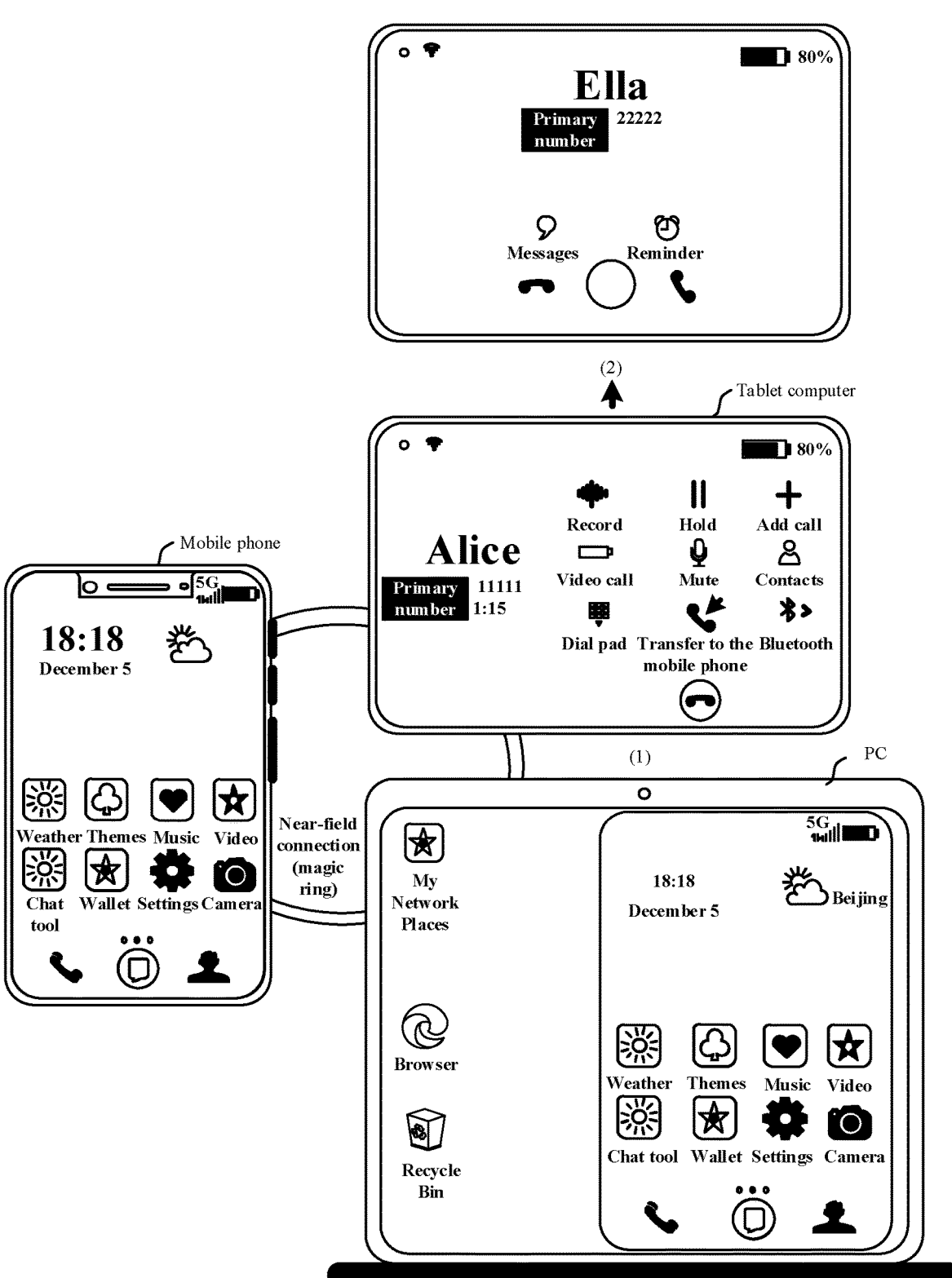
FIG. 5B1

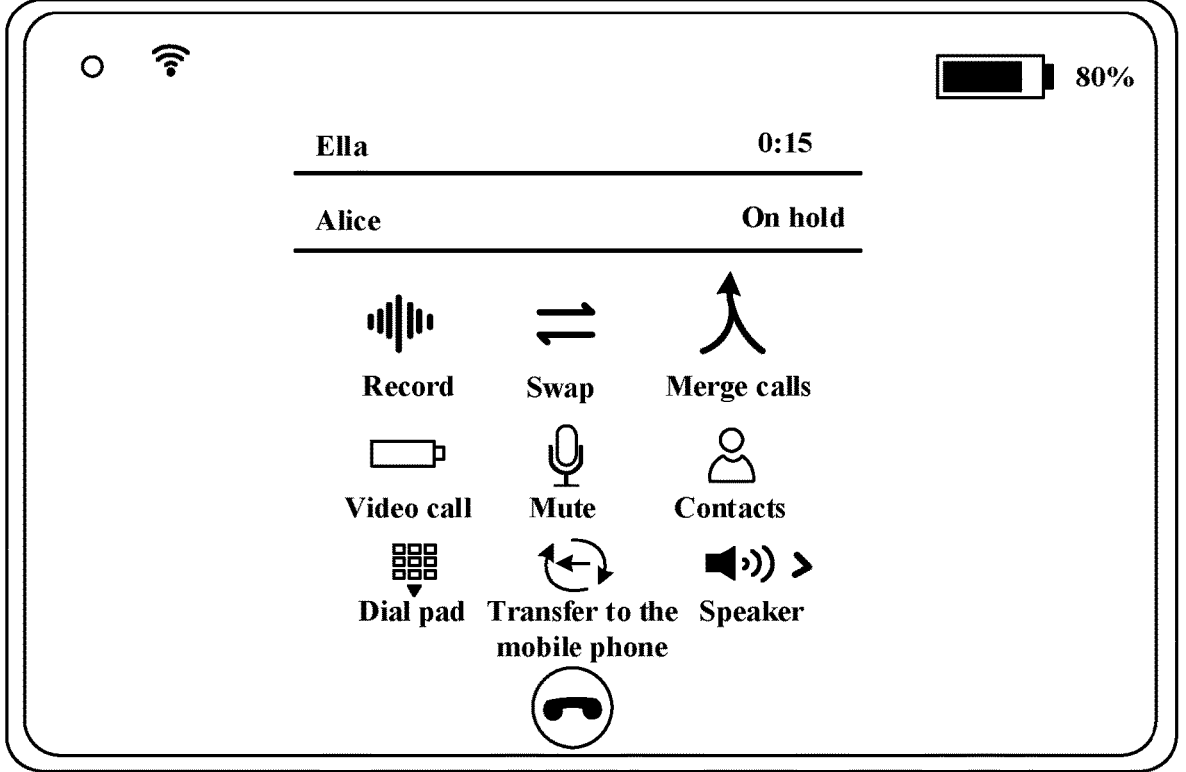
FIG. 5B2

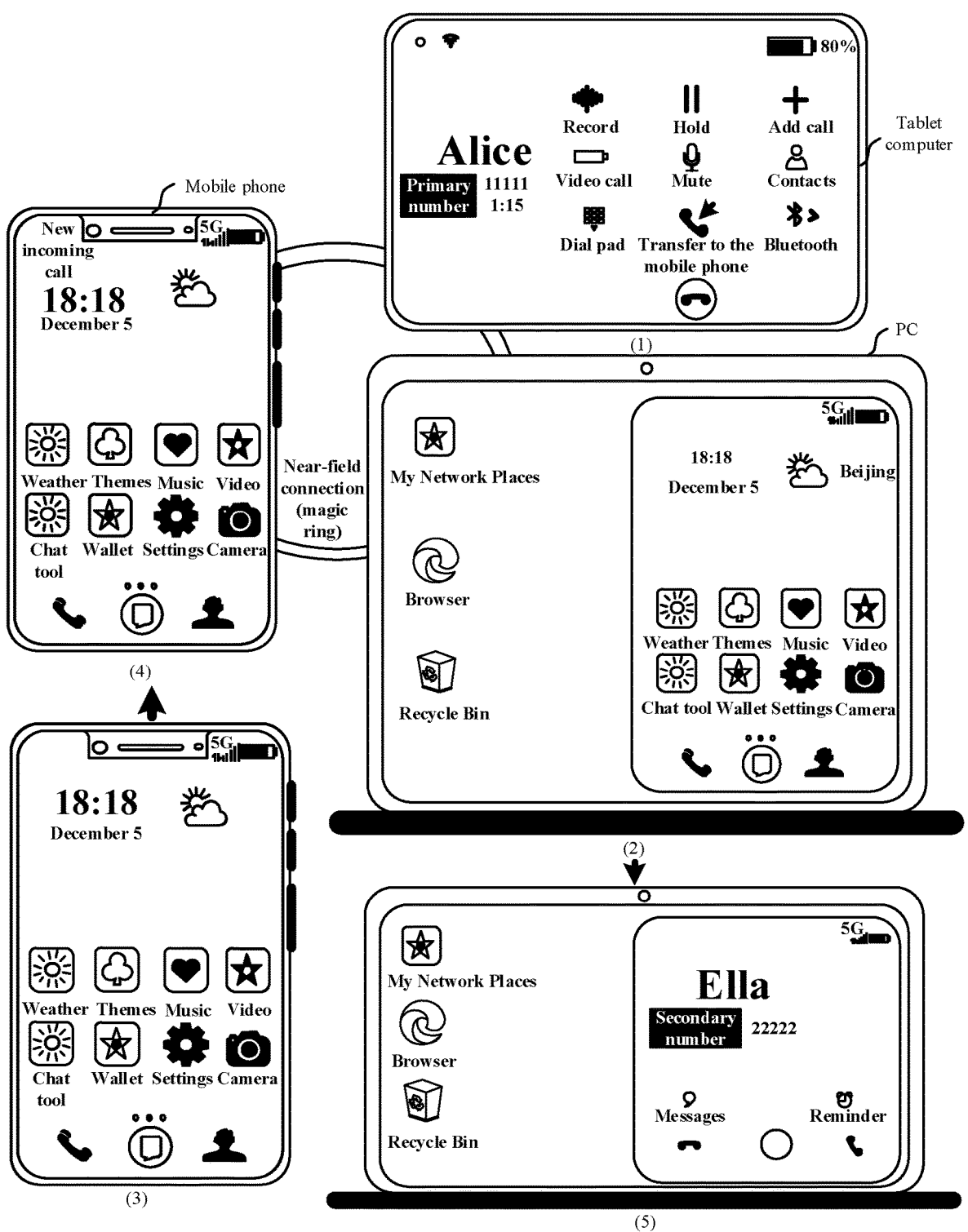
FIG. 5D1

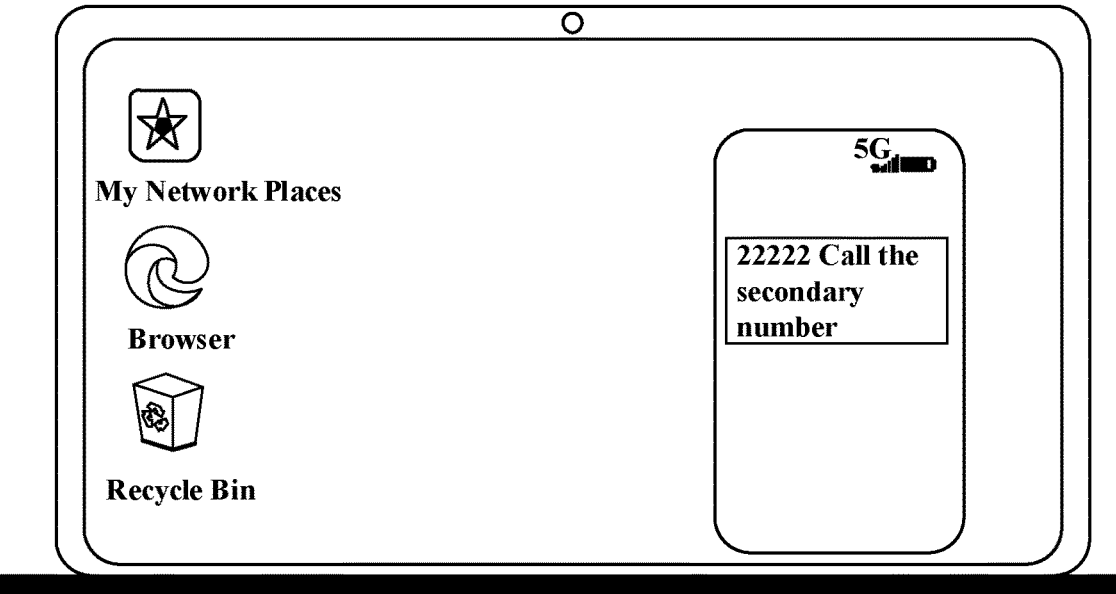
FIG. 5D2

1

DISTRIBUTED CALL CONFLICT PROCESSING METHOD AND SYSTEM, ELECTRONIC DEVICE, AND STORAGE MEDIUM

CROSS-REFERENCE TO RELATED APPLICATIONS

This is a National Stage of International Application No. PCT/CN2022/114933, filed on Aug. 25, 2022, which claims priority to Chinese Patent Application No. 202111492320.X, filed on Dec. 8, 2021, both of which are hereby incorporated by reference in their entireties.

TECHNICAL FIELD

This application relates to the field of electronic technologies, and in particular, to a distributed call conflict processing method and system, an electronic device, and a storage medium.

BACKGROUND

With continuous development of communication technologies, increasingly more electronic devices other than a mobile phone may be added to a communication chain, for example, a tablet computer, a smartwatch, and an in-vehicle device.

In the context of a distributed call, that is, if a called party may be a plurality of electronic devices associated based on a magic ring, when a calling party sends an incoming call event to the called party, the plurality of electronic devices may simultaneously receive the incoming call event, to generate incoming call co-vibration. Further, a user can transfer an operator call between different devices within a near field range based on the magic ring. However, when the operator call is transferred between different devices, the electronic devices on the side of the called party have various call conflict scenarios. This affects user experience.

SUMMARY

In view of this, this application provides a distributed call conflict processing method and system, an electronic device, and a storage medium, to resolve a problem of a call conflict in a distributed call scenario, and improve user experience.

Some implementations of this application provide a distributed call conflict processing method. The following describes this application from a plurality of aspects. For implementations and beneficial effects of the following plurality of aspects, refer to each other.

According to a first aspect, this application provides a distributed call conflict processing method, applied to a system including a first electronic device and a second electronic device, where the first electronic device is near-field connected to the second electronic device, the first electronic device is a device having a telephone call function, the first electronic device has a first SIM card, and the method includes: The first electronic device receives an incoming call event from a calling party, and obtains an incoming call SIM card identifier in the incoming call event; if a SIM card indicated by the incoming call SIM card identifier is the first SIM card, a status identifier of the first SIM card indicates that the first SIM card is occupied, and a status identifier of the second electronic device indicates that the second electronic device is occupied, the first electronic device sends the incoming call event to the second electronic device; and the second electronic device outputs a prompt of an incoming call conflict.

In the distributed call conflict processing method in this embodiment of this application, when a tablet computer answers an incoming call, it indicates that a user focuses on the tablet computer side, so that a prompt of an incoming call conflict is output by using the tablet computer, and a PC is not notified. This can effectively remind the user of the incoming call conflict, reduce impact on use of the PC, and improve user experience.

In a possible implementation of the foregoing first aspect, the method further includes: If the SIM card indicated by the incoming call SIM card identifier is the first SIM card, the status identifier of the first SIM card indicates that the first SIM card is occupied, and a status identifier of the first electronic device indicates that the first electronic device is occupied, the first electronic device outputs a prompt of an incoming call conflict.

In the distributed call conflict processing method in this embodiment of this application, when a mobile phone answers an incoming call, it indicates that a user focuses on a mobile phone side, so that a prompt of an incoming call conflict is output by using the mobile phone, and a tablet computer is not notified. This can effectively remind the user of the incoming call conflict, reduce impact on use of the tablet computer, and improve user experience.

In a possible implementation of the foregoing first aspect, the system further includes a third electronic device, the third electronic device is a device having a modulation and demodulation function, the first electronic device further includes a second SIM card, and the method further includes: If the SIM card indicated by the incoming call SIM card identifier is the second SIM card, the status identifier of the first SIM card indicates that the first SIM card is occupied, and the status identifier of the second electronic device indicates that the second electronic device is occupied, the first electronic device sends data of the second SIM card to the third electronic device, and sends the incoming call event to the third electronic device; and the third electronic device outputs an incoming call prompt by using the data of the second SIM card.

In the distributed call conflict processing method in this embodiment of this application, when a tablet computer answers an incoming call, it indicates that a user focuses on the tablet computer side. In this case, a PC outputs a prompt of an incoming call conflict, to prompt the user. In addition, no prompt is displayed in a call interface of a mobile phone, anew incoming call notification of the user is displayed in a status bar, and a missed call log is generated, so that the user notices, in a timely manner, an incoming call that causes a call conflict, thereby improving user experience.

In a possible implementation of the foregoing first aspect, the first electronic device further has a second SIM card, and the method further includes: If the SIM card indicated by the incoming call SIM card identifier is the second SIM card, the status identifier of the first SIM card indicates that the first SIM card is occupied, and a status identifier of the first electronic device indicates that the first electronic device is occupied, the first electronic device outputs a prompt of an incoming call conflict.

In the distributed call conflict processing method in this embodiment of this application, when a mobile phone answers an incoming call, it indicates that a user focuses on a mobile phone side, so that a prompt of an incoming call conflict is output by using the mobile phone, and a tablet computer is not notified. This can effectively remind the user of the incoming call conflict, reduce impact on use of the tablet computer, and improve user experience.

In a possible implementation of the foregoing first aspect, the second electronic device is a device having a modulation and demodulation function, the first electronic device further has a second SIM card, and the method further includes: If the SIM card indicated by the incoming call SIM card identifier is the second SIM card, the status identifier of the first SIM card indicates that the first SIM card is occupied, and a status identifier of the first electronic device indicates that the first electronic device is occupied, the first electronic device sends data of the second SIM card to the second electronic device, and sends the incoming call event to the second electronic device; and the second electronic device outputs an incoming call prompt by using the data of the second SIM card.

In the distributed call conflict processing method in this embodiment of this application, when a mobile phone answers an incoming call, it indicates that a user focuses on the mobile phone side. However, the mobile phone does not support a dual-call function. In this case, a tablet computer outputs a prompt of an incoming call conflict, to prompt the user. In addition, no prompt is displayed in a call interface of a mobile phone, a new incoming call notification of the user is displayed in a status bar, and a missed call log is generated, so that the user notices, in a timely manner, an incoming call that causes a call conflict, thereby improving user experience.

In a possible implementation of the foregoing first aspect, the method further includes: If the SIM card indicated by the incoming call SIM card identifier is the second SIM card, and the status identifier of the first SIM card indicates that the first SIM card is occupied, the first electronic device displays a new incoming call notification in a status bar, and generates a missed call log for the incoming call event.

In a possible implementation of the foregoing first aspect, the method further includes: The second electronic device sends an outgoing call event to the first electronic device; the first electronic device receives the outgoing call event, and obtains an outgoing call SIM card identifier in the outgoing call event; if a SIM card indicated by the outgoing call SIM card identifier is the first SIM card, and the status identifier of the first SIM card indicates that the first SIM card is occupied, the first electronic device sends status information to the second electronic device, where the status information includes the first SIM card being in a call state; and the second electronic device outputs a prompt of outgoing call failure based on the status information.

In the distributed call conflict processing method in this embodiment of this application, when the mobile phone or the tablet computer answers an incoming call, if the second electronic device makes a call, there is a problem of an outgoing call conflict, and the second electronic device outputs a prompt of outgoing call failure, thereby avoiding ineffective waiting of a user of the second electronic device, also avoiding impact on a call on the mobile phone side, and improving user experience.

In a possible implementation of the foregoing first aspect, the second electronic device is an electronic device having a modulation and demodulation function, the first electronic device further has a second SIM card, and the method further includes: The first electronic device sends data of the second SIM card to the second electronic device; and the second electronic device sends an outgoing call event to another device by using the data of the second SIM card.

In the distributed call conflict processing method in this embodiment of this application, when answering an incoming call by using one SIM card, the mobile phone or the tablet computer may send data of the other SIM card to the second electronic device (such as the PC), so that the user can communicate with a remote device by using the other SIM card, to meet a call requirement of the user to a maximum extent and improve user experience.

In a possible implementation of the foregoing first aspect, the method further includes: The second electronic device sends outgoing call information of the outgoing call event to the first electronic device; and the first electronic device generates a call log for the second SIM card based on the outgoing call information.

In a possible implementation of the foregoing first aspect, the first electronic device includes a first distributed framework, and the second electronic device includes a second distributed framework; and the first electronic device communicates with the second distributed framework of the second electronic device by using the first distributed framework, so that the first electronic device and the second electronic device synchronously receive the incoming call event of the calling party.

According to a second aspect, this application provides a distributed call conflict processing method, applied to a first electronic device, where the first electronic device and a second electronic device belong to a same system, the first electronic device is a device having a telephone call function, the first electronic device has a first SIM card, and the method includes: The first electronic device receives an incoming call event from a calling party, and obtains an incoming call SIM card identifier in the incoming call event; and if a SIM card indicated by the incoming call SIM card identifier is the first SIM card, a status identifier of the first SIM card indicates that the first SIM card is occupied, and a status identifier of the second electronic device indicates that the second electronic device is occupied, the first electronic device sends the incoming call event to the second electronic device; so that the second electronic device outputs a prompt of an incoming call conflict.

In the distributed call conflict processing method in this embodiment of this application, when a tablet computer answers an incoming call, it indicates that a user focuses on the tablet computer side, so that a prompt of an incoming call conflict is output by using the tablet computer, and a PC is not notified. This can effectively remind the user of the incoming call conflict, reduce impact on use of the PC, and improve user experience.

In a possible implementation of the foregoing second aspect, the method further includes: If the SIM card indicated by the incoming call SIM card identifier is the first SIM card, the status identifier of the first SIM card indicates that the first SIM card is occupied, and a status identifier of the first electronic device indicates that the first electronic device is occupied, the first electronic device outputs a prompt of an incoming call conflict.

In the distributed call conflict processing method in this embodiment of this application, when a mobile phone answers an incoming call, it indicates that the user focuses on a mobile phone side, so that a prompt of an incoming call conflict is output by using the mobile phone, and a tablet computer is not notified. This can effectively remind the user of the incoming call conflict, reduce impact on use of the tablet computer, and improve user experience.

In a possible implementation of the foregoing second aspect, the system further includes a third electronic device, the third electronic device is a device having a modulation and demodulation function, the first electronic device further includes a second SIM card, and the method further includes: If the SIM card indicated by the incoming call SIM card identifier is the second SIM card, the status identifier of the first SIM card indicates that the first SIM card is occupied, and the status identifier of the second electronic device indicates that the second electronic device is occupied, the first electronic device sends data of the second SIM card to the third electronic device, and sends the incoming call event to the third electronic device, so that the third electronic device outputs an incoming call prompt by using the data of the second SIM card.

In the distributed call conflict processing method in this embodiment of this application, when a tablet computer answers an incoming call, it indicates that the user focuses on the tablet computer side. In this case, a PC outputs a prompt of an incoming call conflict, to prompt the user. In addition, no prompt is displayed in a call interface of a mobile phone, anew incoming call notification of the user is displayed in a status bar, and a missed call log is generated, so that the user notices, in a timely manner, an incoming call that causes a call conflict, thereby improving user experience.

In a possible implementation of the foregoing second aspect, the first electronic device further has a second SIM card, and the method further includes: If the SIM card indicated by the incoming call SIM card identifier is the second SIM card, the status identifier of the first SIM card indicates that the first SIM card is occupied, and a status identifier of the first electronic device indicates that the first electronic device is occupied, the first electronic device outputs a prompt of an incoming call conflict.

In the distributed call conflict processing method in this embodiment of this application, when a mobile phone answers an incoming call, it indicates that the user focuses on a mobile phone side, so that a prompt of an incoming call conflict is output by using the mobile phone, and a tablet computer is not notified. This can effectively remind the user of the incoming call conflict, reduce impact on use of the tablet computer, and improve user experience.

In a possible implementation of the foregoing second aspect, the second electronic device is a device having a modulation and demodulation function, the first electronic device further has a second SIM card, and the method further includes: If the SIM card indicated by the incoming call SIM card identifier is the second SIM card, the status identifier of the first SIM card indicates that the first SIM card is occupied, and a status identifier of the first electronic device indicates that the first electronic device is occupied, the first electronic device sends data of the second SIM card to the second electronic device, and sends the incoming call event to the second electronic device, so that the second electronic device outputs an incoming call prompt by using the data of the second SIM card.

In the distributed call conflict processing method in this embodiment of this application, when a mobile phone answers an incoming call, it indicates that the user focuses on the mobile phone side. However, the mobile phone does not support a dual-call function. In this case, a tablet computer outputs a prompt of an incoming call conflict, to prompt the user. In addition, no prompt is displayed in a call interface of a mobile phone, a new incoming call notification of the user is displayed in a status bar, and a missed call log is generated, so that the user notices, in a timely manner, an incoming call that causes a call conflict, thereby improving user experience.

In a possible implementation of the foregoing second aspect, the method further includes: If the SIM card indicated by the incoming call SIM card identifier is the second SIM card, and the status identifier of the first SIM card indicates that the first SIM card is occupied, the first electronic device displays a new incoming call notification in a status bar, and generates a missed call log for the incoming call event.

In a possible implementation of the foregoing second aspect, the method further includes: The first electronic device receives an outgoing call event sent by the second electronic device, and obtains an outgoing call SIM card identifier in the outgoing call event; and if a SIM card indicated by the outgoing call SIM card identifier is the first SIM card, and the status identifier of the first SIM card indicates that the first SIM card is occupied, the first electronic device sends status information to the second electronic device, where the status information includes the first SIM card being in a call state, so that the second electronic device outputs a prompt of outgoing call failure based on the status information.

In the distributed call conflict processing method in this embodiment of this application, when the mobile phone or the tablet computer answers an incoming call, if another second electronic device makes a call, there is a problem of an outgoing call conflict, and the second electronic device outputs a prompt of outgoing call failure, thereby avoiding ineffective waiting of a user of the second electronic device, also avoiding impact on a call on the mobile phone side, and improving user experience.

In a possible implementation of the foregoing second aspect, the second electronic device is an electronic device having a modulation and demodulation function, the first electronic device further has a second SIM card, and the method further includes: The first electronic device sends data of the second SIM card to the second electronic device, so that the second electronic device sends an outgoing call event to another device by using the data of the second SIM card.

In the distributed call conflict processing method in this embodiment of this application, when answering an incoming call by using one SIM card, the mobile phone or the tablet computer may send data of the other SIM card to the second electronic device (such as the PC), so that the user can communicate with a remote device by using the other SIM card, to meet a call requirement of the user to a maximum extent and improve user experience.

In a possible implementation of the foregoing second aspect, the method further includes: The first electronic device receives outgoing call information that is of the outgoing call event and that is sent by the second electronic device; and the first electronic device generates a call log for the second SIM card based on the outgoing call information.

In a possible implementation of the foregoing second aspect, the first electronic device includes a first distributed framework, and the second electronic device includes a second distributed framework; and the first electronic device communicates with the second distributed framework of the second electronic device by using the first distributed framework, so that the first electronic device and the second electronic device synchronously receive the incoming call event of the calling party.

According to a third aspect, this application provides a distributed call conflict processing method, applied to a second electronic device, where the second electronic device and a first electronic device belong to a same system, the first electronic device is a device having a telephone call function, the first electronic device has a first SIM card, and the method includes: The second electronic device receives an incoming call event sent by the first electronic device, where the incoming call event is an incoming call event received by the first electronic device from a calling party, a SIM card indicated by an incoming call SIM card identifier in the incoming call event is the first SIM card, a status identifier of the first SIM card indicates that the first SIM card is occupied, and a status identifier of the second electronic device indicates that the second electronic device is occupied; and the second electronic device outputs a prompt of an incoming call conflict.

In the distributed call conflict processing method in this embodiment of this application, when a tablet computer answers an incoming call, it indicates that a user focuses on the tablet computer side, so that a prompt of an incoming call conflict is output by using the tablet computer, and a PC is not notified. This can effectively remind the user of the incoming call conflict, reduce impact on use of the PC, and improve user experience.

In a possible implementation of the foregoing third aspect, the second electronic device is a device having a modulation and demodulation function, the first electronic device further has a second SIM card, and the method further includes: The second electronic device receives data of the second SIM card that is sent by the first electronic device, and receives the incoming call event sent by the first electronic device, where the incoming call event is an incoming call event received by the first electronic device from the calling party, the SIM card indicated by the incoming call SIM card identifier in the incoming call event is the second SIM card, the status identifier of the first SIM card indicates that the first SIM card is occupied, and a status identifier of the first electronic device indicates that the first electronic device is occupied; and the second electronic device outputs an incoming call prompt by using the data of the second SIM card.

In the distributed call conflict processing method in this embodiment of this application, when a mobile phone answers an incoming call, it indicates that a user focuses on the mobile phone side. However, the mobile phone does not support a dual-call function. In this case, a tablet computer outputs a prompt of an incoming call conflict, to prompt the user. In addition, no prompt is displayed in a call interface of a mobile phone, a new incoming call notification of the user is displayed in a status bar, and a missed call log is generated, so that the user notices, in a timely manner, an incoming call that causes a call conflict, thereby improving user experience.

In a possible implementation of the foregoing third aspect, the method further includes: The second electronic device sends an outgoing call event to the first electronic device, so that the first electronic device sends status information to the second electronic device when a SIM card indicated by an outgoing call SIM card identifier in the outgoing call event is the first SIM card and the status identifier of the first SIM card indicates that the first SIM card is occupied, where the status information includes the first SIM card being in a call state; and the second electronic device outputs a prompt of outgoing call failure based on the status information.

In the distributed call conflict processing method in this embodiment of this application, when the mobile phone or the tablet computer answers an incoming call, if the second electronic device makes a call, there is a problem of an outgoing call conflict, and the another second electronic device outputs a prompt of outgoing call failure, thereby avoiding ineffective waiting of a user of the second electronic device, also avoiding impact on a call on the mobile phone side, and improving user experience.

In a possible implementation of the foregoing third aspect, the second electronic device is an electronic device having a modulation and demodulation function, the first electronic device further has a second SIM card, and the method further includes: The second electronic device receives data of the second SIM card that is sent by the first electronic device; and the second electronic device sends an outgoing call event to another device by using the data of the second SIM card.

In the distributed call conflict processing method in this embodiment of this application, when answering an incoming call by using one SIM card, the mobile phone or the tablet computer may send data of the other SIM card to the second electronic device (such as the PC), so that the user can communicate with a remote device by using the other SIM card, to meet a call requirement of the user to a maximum extent and improve user experience.

In a possible implementation of the foregoing third aspect, the method further includes: The second electronic device sends outgoing call information of the outgoing call event to the first electronic device, so that the first electronic device generates a call log for the second SIM card based on the outgoing call information.

According to a fourth aspect, this application provides a distributed call conflict processing system, including:

a first electronic device, configured to perform any method in the embodiment of the foregoing second aspect; and a second electronic device, configured to perform any method in the embodiment of the foregoing third aspect.

According to a fifth aspect, this application provides an electronic device, including:

a memory, configured to store instructions to be executed by one or more processors of the device; and the processor, configured to execute the instructions, so that the electronic device performs any method in the embodiment of the foregoing second aspect or any method in the embodiment of the foregoing third aspect.

According to a sixth aspect, this application provides a computer-readable storage medium, where the computer-readable storage medium stores a computer program, and when the computer program is run on an electronic device, the electronic device is enabled to perform any method in the embodiment of the foregoing second aspect or any method in the embodiment of the foregoing third aspect.

According to a seventh aspect, this application provides a computer program product including instructions, where when the computer program product runs on an electronic device, the electronic device is enabled to perform any method in the embodiment of the foregoing second aspect or any method in the embodiment of the foregoing third aspect.

BRIEF DESCRIPTION OF DRAWINGS

FIG. 4A1 is an interaction flowchart of a distributed call conflict processing method in a scenario according to an embodiment of this application;

FIG. 4A(2)(a) and FIG. 4A(2)(b) are a detailed interaction flowchart in the scenario shown in FIG. 4A1;

FIG. 4B1-FIG. 4E are schematic diagrams of interfaces for call conflict processing on a mobile phone, a tablet computer, and a PC based on the interaction flowcharts shown in FIG. 4A1, FIG. 4A(2)(a), and FIG. 4A(2)(b);

FIG. 5A1 is an interaction flowchart of a distributed call conflict processing method in another scenario according to an embodiment of this application;

FIG. 5A(2)(a) and FIG. 5A(2)(b) are a detailed interaction flowchart in the scenario shown in FIG. 5A1;

FIG. 5B1-FIG. 5E are schematic diagrams of interfaces for call conflict processing on a mobile phone, a tablet computer, and a PC based on the interaction flowcharts shown in FIG. 5A1, FIG. 5A(2)(a), and FIG. 5A(2)(b);

Figure 1A:
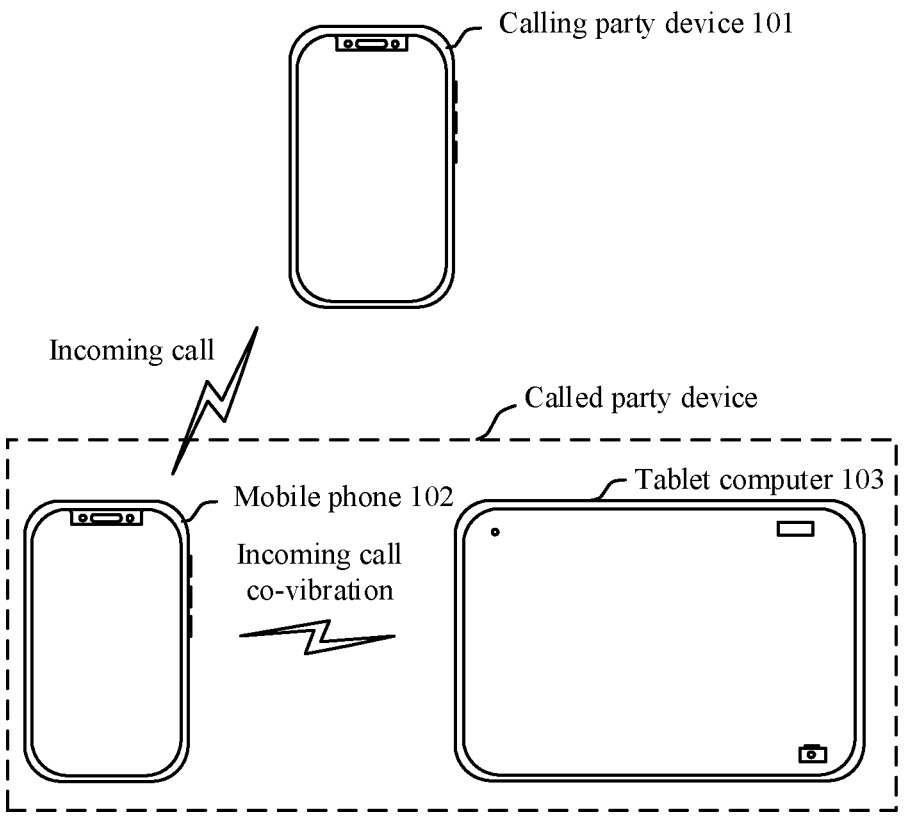
FIG. 1A is a scenario diagram of a distributed architecture of a call system according to an embodiment of this application.

In this embodiment of this application, the first electronic device is an electronic device that has a telephone call function. For example, the telephone call function may be a mobile data call capability implemented by using a base station, for example, making/answering a call, or may be an IP call capability implemented by using a cellular network, for example, a WeChat voice call. For a mobile phone 102 and a tablet computer 103 shown in FIG. 1A, the mobile phone 102 and the tablet computer 103 are near-field connected. For example, the mobile phone 102 and the tablet computer 103 are on a magic ring, and the near-field connection may be a network connection in a same local area network, a Bluetooth connection, or the like. On the magic ring, the mobile phone 102 and the tablet computer 103 may be devices with a same account, to improve call security.

When the calling party device 101 initiates a telephone call to a plurality of called party devices, the mobile phone 102 in the called party devices detects whether a call conflict exists. When no call conflict exists, the mobile phone 102 and the tablet computer 103 may simultaneously output a prompt of an incoming call event (that is, implement incoming call co-vibration).

In this embodiment of this application, the mobile phone may be a single subscriber identity module (Subscriber Identity Module, SIM) card mobile phone or a dual SIM card mobile phone, and the dual SIM card mobile phone may be a mobile phone that supports dual-call, or may be a mobile phone that does not support dual-call. Supporting dual-call means that when the mobile phone makes/answers a call by using one SIM card, answering of a call for the other SIM card is not affected. Based on this, the call conflict may include a plurality of scenarios shown in Table 1.

TABLE 1

| The mobile phone 102 answers a distributed call | Single SIM card mobile phone | Scenario 1: New incoming call |
| | | Scenario 2: The tablet computer 103 makes a call |
| | Dual SIM card mobile phone | Scenario 3: New incoming call for a SIM card during a call |
| | | Scenario 4: New incoming call for the other SIM card |
| | | Scenario 5: The tablet computer 103 makes a call |
| The tablet computer 103 answers a distributed call | Single SIM card mobile phone | Scenario 6: New incoming call |
| | | Scenario 7: Another device makes a call on the magic ring |
| | Dual SIM card mobile phone | Scenario 8: New incoming call for a SIM card during a call |
| | | Scenario 9: New incoming call for the other SIM card |
| | | Scenario 10: Another device makes a call on the magic ring |

DESCRIPTION OF EMBODIMENTS

The following clearly describes technical solutions in embodiments of this application with reference to the accompanying drawings in the embodiments of this application.

FIG. TA shows an example of a scenario diagram of a distributed architecture of a call system according to an embodiment of this application. The scenario diagram includes a calling party device 101 and a called party device, and the called party device may include at least one first electronic device that can implement a mobile data call capability with the calling party device 101, and at least one second electronic device.

The mobile phone 102 that receives an incoming call signal determines whether any one of the foregoing call conflict scenarios exists, and when any one of the foregoing call conflict scenarios exists, performs corresponding call conflict processing.

For example, if the foregoing scenario 1 or scenario 3 exists, the mobile phone 102 outputs a prompt of an incoming call conflict, such as a ring, a vibration, and an interface prompt. The interface prompt may include displaying an incoming call number, an incoming call user name, an answer key, and/or a hang-up key in an interface. Based on the prompt of the incoming call conflict, a user may learn of related information of the call conflict, and then perform a related operation. For example, the user may tap the answer key, so that the mobile phone 102 answers the new incoming call, or the user may tap the hang-up key, so that the mobile phone 102 hangs up the new incoming call. When answering the new incoming call, the mobile phone 102 may hang up or hold an old incoming call. This is not limited.

In this embodiment of this application, that the mobile phone 102 answers an incoming call is used to indicate that the mobile phone 102 communicates with a calling party, and that the mobile phone 102 hangs up an incoming call is used to indicate that the mobile phone 102 disconnects communication with the calling party. After answering the new incoming call, the mobile phone 102 may hold or hang up the old incoming call.

In the foregoing scenario 1 or scenario 3, the mobile phone 102 does not send an incoming call event to the tablet computer 103 and another device that is near-field connected, that is, the tablet computer 103 and the another device do not perform incoming call co-vibration with the mobile phone 102, to reduce impact on normal use of the tablet computer 103 and the another device that is near-field connected.

If the foregoing scenario 2 exists, that is, if the user makes a call on the tablet computer 103, the tablet computer 103 generates an outgoing call event, starts an outgoing call interface, and sends the outgoing call event to the mobile phone 102. In this case, the mobile phone 102 obtains a call status of a SIM card, and sends the call status of the SIM card to the tablet computer 103. The tablet computer 103 determines, based on the received information, that the SIM card is in a call state, closes the outgoing call interface, and outputs a prompt of outgoing call failure, such as a ring, a vibration, and an interface prompt, to prompt the user that a new call cannot be started and an outgoing call fails.

The outgoing call interface is an interface for making a call to a remote device, and the outgoing call interface may display a number of a dialed call, a user name of the dialed call, a hang-up key, and/or the like. When the user makes a call on the tablet computer 103, the tablet computer 103 and the mobile phone 102 serve as calling device, and the remote device serves as a called device. For the called device, the foregoing outgoing call event is an incoming call event.

If the foregoing scenario 4 exists, for a mobile phone that supports dual-call, the mobile phone 102 outputs a prompt of an incoming call conflict. In the foregoing scenario 4, the mobile phone 102 does not send an incoming call event to the tablet computer 103 and another device that is near-field connected, that is, the tablet computer 103 and the another device do not perform incoming call co-vibration with the mobile phone 102, to reduce impact on normal use of the tablet computer 103 and the another device that is near-field connected.

If the foregoing scenario 4 exists, for a mobile phone that does not support dual-call, the mobile phone 102 sends an incoming call event to the tablet computer 103, and transmits data of a SIM card with a new incoming call to the tablet computer 103, that is, virtualizes the SIM card with the new incoming call to the tablet computer 103. In this case, the tablet computer 103 is registered with an operator network based on the data of the SIM card with the new incoming call and by using an idle SIM card slot (which is actually using idle modulation and modulation and radio frequency resources), so that the tablet computer 103 has a call capability of the SIM card with the new incoming call. The tablet computer 103 that has the call capability of the SIM card with the new incoming call outputs an incoming call prompt based on the incoming call event, such as a ring, a vibration, an interface prompt, and a pop-up window.

In addition, in the foregoing scenario 4, the mobile phone 102 that does not support dual-call may further display a new incoming call notification in a status bar, and generate a missed call log for the incoming call event.

If the foregoing scenario 5 exists, the mobile phone 102 transmits data of a SIM card with a new incoming call to the tablet computer 103. The tablet computer 103 is registered with an operator network based on the data of the SIM card with the new incoming call and by using an idle SIM card slot, so that the tablet computer 103 has a call capability of the SIM card with the new incoming call. By default, the tablet computer 103 that has the call capability of the SIM card with the new incoming call directly sends an outgoing call event to a remote called device by using the SIM card with the new incoming call, and communicates with the remote called device.

If the foregoing scenario 6 or scenario 8 exists, the mobile phone 102 sends an incoming call event to the tablet computer 103, so that the mobile phone 102 and the tablet computer 103 implement incoming call co-vibration. Herein, the mobile phone 102 does not send the incoming call event to another device that is near-field connected, that is, the another device does not perform incoming call co-vibration with the mobile phone 102, to avoid affecting normal use of the another device that is near-field connected. The tablet computer 103 receives the incoming call event, determines that the foregoing scenario 6 or scenario 8 exists, and outputs a prompt of an incoming call conflict, such as a ring, a vibration, and an interface prompt.

If the foregoing scenario 7 exists, that is, if another device that is near-field connected sends an outgoing call event to the mobile phone 102, the mobile phone 102 obtains a call status of a SIM card, and sends the call status of the SIM card to the another device. The another device determines, based on the received information, that the SIM card is in a call state, closes an outgoing call interface, and outputs a prompt of outgoing call failure, such as a ring, a vibration, and an interface prompt, to prompt the user that a new call cannot be started and an outgoing call fails.

If the foregoing scenario 9 exists, the mobile phone 102 sends an incoming call event to another device that is near-field connected, and transmits data of a SIM card with a new incoming call to the another device, that is, virtualizes the SIM card with the new incoming call to the another device. In this case, the another device is registered with an operator network based on the data of the SIM card with the new incoming call and by using an idle SIM card slot (which is actually using idle modulation and demodulation and radio frequency resources), so that the another device has a call capability of the SIM card with the new incoming call. The another device that has the call capability of the SIM card with the new incoming call outputs an incoming call prompt based on the incoming call event, such as a ring, a vibration, and a pop-up window, to notify the user that a new incoming call exists.

In addition, in the foregoing scenario 9, the mobile phone 102 may further display a new incoming call notification in a status bar, and generate a missed call log for the incoming call event.

If the foregoing scenario 10 exists, the mobile phone 102 transmits data of a SIM card with a new incoming call to another device that is near-field connected. The another device is registered with an operator network based on the data of the SIM card with the new incoming call and by using an idle SIM card slot, so that the another device has a call capability of the SIM card with the new incoming call. By default, the another device that has the call capability of the SIM card with the new incoming call directly sends an outgoing call event to a remote called device by using the SIM card with the new incoming call, and communicates with the remote called device.

For the foregoing scenario 4 in which the mobile phone does not support dual-call, the foregoing scenario 5, the foregoing scenario 9, and the foregoing scenario 10, to implement the foregoing embodiments, the device that is registered with the operator network by using the idle SIM card slot needs to have a modulation and demodulation function.

In this embodiment of this application, the mobile phone 102 may record a status identifier of a SIM card, a status identifier of the mobile phone 102, and a status identifier of the tablet computer 103. The tablet computer 103 may record a status identifier of a SIM card and the status identifier of the tablet computer 103. The foregoing status identifier indicates whether a corresponding device is occupied, to determine a device that establishes a call connection to the remote calling device. For example, if a status identifier of a SIM card 1 indicates that the SIM card 1 is occupied, and the status identifier of the mobile phone 102 indicates that the mobile phone 102 is occupied, it indicates that the mobile phone 102 establishes a call connection to the remote calling device by using the SIM card 1. For another example, if a status identifier of a SIM card 1 indicates that the SIM card 1 is occupied, and the status identifier of the tablet computer 103 indicates that the tablet computer 103 is occupied, it indicates that the tablet computer 103 establishes a call connection to the remote calling device by using the SIM card 1.

In this embodiment of this application, the call conflict scenario may be understood as follows: When establishing a call connection to the remote calling device by using a SIM card, the mobile phone 102 or the tablet computer 103 further receives a new incoming call event or generates a new outgoing call event.

In the foregoing embodiment, description is provided by using the mobile phone as the first electronic device and the tablet computer as the second electronic device. In some embodiments of this application, the first electronic device may be a tablet computer or a notebook computer that has a mobile data call capability, or a wearable electronic device such as a watch. The second electronic device may be an electronic device that has a mobile data call capability, or may be an electronic device that has no mobile data call capability but can perform data communication with the first electronic device by using a network, for example, a mobile phone, a tablet computer, a notebook computer, an ultra-mobile personal computer, a personal digital assistant (Personal Digital Assistant, PDA), a television, or a wearable electronic device such as a watch or a band.

Figure 1B:
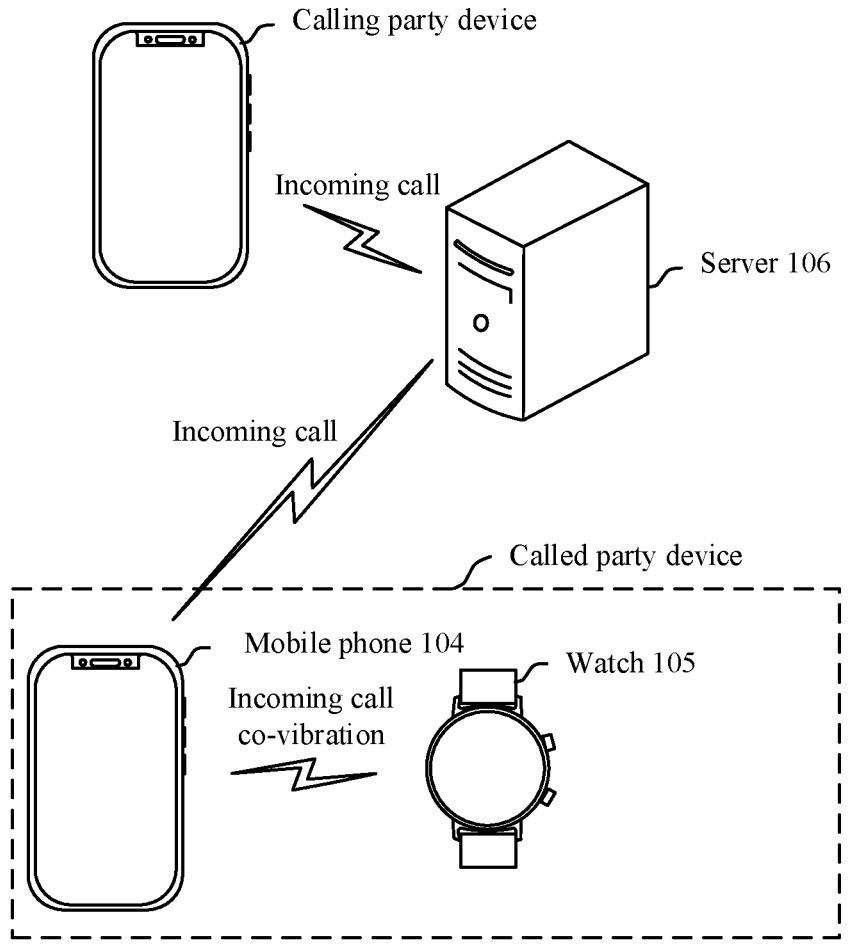
FIG. 1B is another scenario diagram of a distributed architecture of a call system according to an embodiment of this application.

In another scenario of this application, incoming call co-vibration may be that a server simultaneously delivers an incoming call signal to the mobile phone and the tablet computer, so that the mobile phone and the tablet computer implement incoming call co-vibration. FIG. 1B shows an example of another scenario diagram of a distributed architecture of a call system according to an embodiment of this application. In this scenario, a server 106 may send an incoming call signal to a mobile phone 104. The mobile phone 104 and a watch 105 may be wirelessly connected, for example, through Bluetooth. The mobile phone 104 may send the incoming call signal to the watch 105 through Bluetooth, so that the mobile phone 104 and the watch 105 implement incoming call co-vibration. A call conflict processing procedure for the mobile phone and the watch is described above, and is not described herein.

The following describes the distributed call conflict processing method in this embodiment of this application with reference to specific structures of the first electronic device and the second electronic device.

Figure 2A:
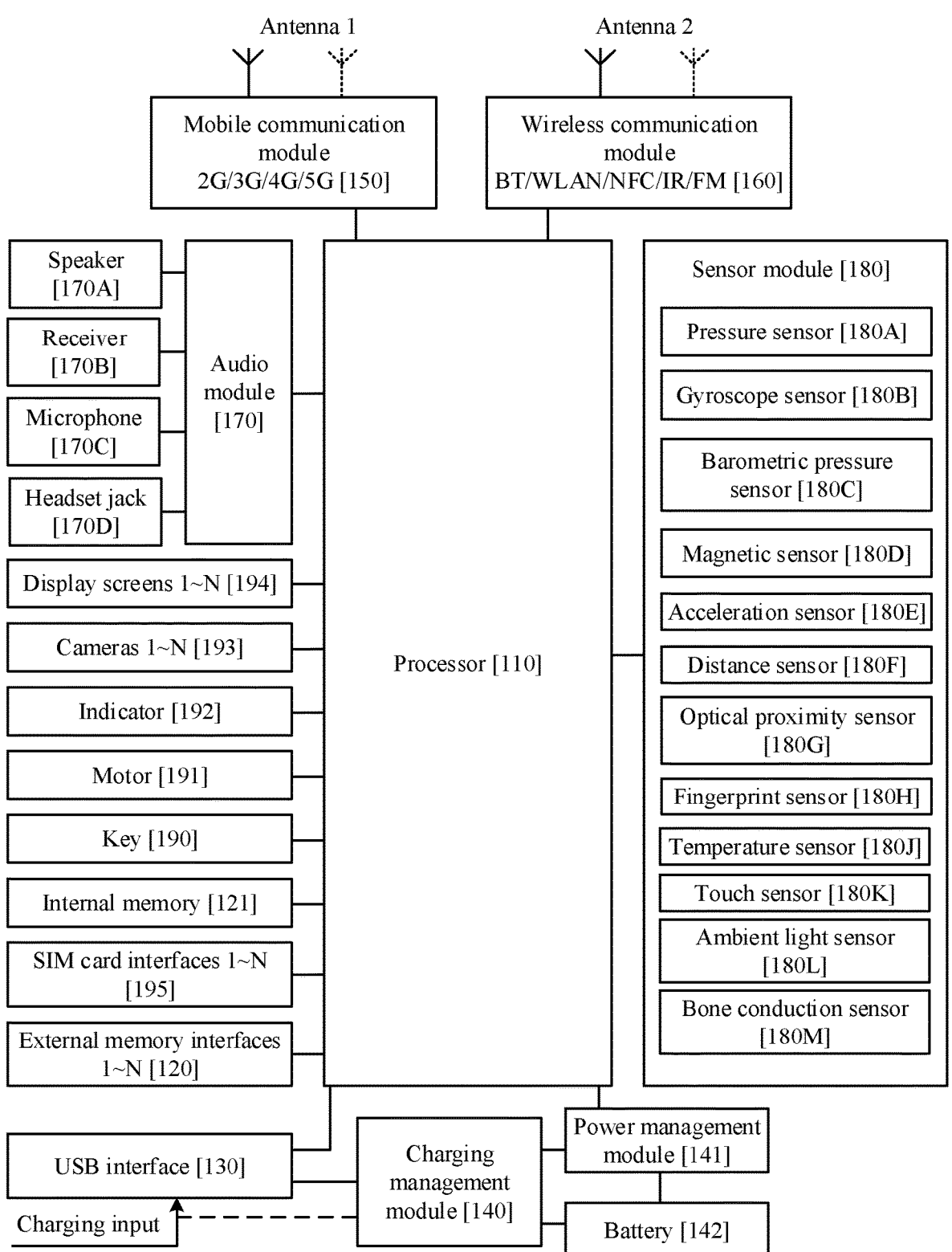
FIG. 2A is a schematic diagram of a structure of an electronic device according to an embodiment of this application.

FIG. 2A is a schematic diagram of a structure of an electronic device according to an embodiment of this application. The electronic device shown in FIG. 2A may be used as the first electronic device, or may be used as the second electronic device. The electronic device shown in FIG. 2A may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identity module (Subscriber Identity Module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the electronic device. In some other embodiments of this application, the electronic device may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (Application Processor, AP), a modem processor (modem), a graphics processing unit (Graphics Processing Unit, GPU), an image signal processor (Image Signal Processor, ISP), a controller, a memory, a video codec, a digital signal processor (Digital Signal Processor, DSP), a baseband processor, a neural-network processing unit (Neural-network Processing Unit, NPU), and/or the like. Different processing units may be independent components, or may be integrated into one or more processors.

The processor 110 may generate an operation control signal based on instruction operation code and a timing signal, to complete control of instruction fetching and instruction execution.

A memory may be further disposed in the processor 110 to store instructions and data. In some embodiments, the memory in the processor 110 is a cache. The memory may store instructions or data that are or is just used or cyclically used by the processor 110. If the processor 110 needs to use the instructions or the data again, the instructions or the data may be invoked directly from the memory, to avoid repeated access and reduce waiting time of the processor 110, thereby improving system efficiency.

In some embodiments, the processor 110 may include one or more interfaces. The interface may include an inter-integrated circuit (Inter-Integrated Circuit, I2C) interface, an inter-integrated circuit sound (Inter-Integrated Circuit Sound, I2S) interface, a pulse code modulation (Pulse Code Modulation, PCM) interface, a universal asynchronous receiver/transmitter (Universal Asynchronous Receiver/Transmitter, UART) interface, a mobile industry processor interface (Mobile Industry Processor Interface, MIPI), a general-purpose input/output (General-Purpose Input/Output, GPIO) interface, and a subscriber identity module (Subscriber Identity Module, SIM) interface.

The I2C interface is a bidirectional synchronous serial bus, including a serial data line (Serial Data Line, SDA) and a serial clock line (Serial Clock Line, SCL). In some embodiments, the processor 110 may include a plurality of I2C interfaces. The processor 110 may be separately coupled to the touch sensor 180K, a charger, a camera flash, the camera 193, and the like by using different I2C interfaces. For example, the processor 110 may be coupled to the touch sensor 180K by using the I2C interface, so that the processor 110 and the touch sensor 180K communicate with each other by using the I2C interface, thereby implementing a touch function of the electronic device.

The I2S interface may be used for audio communication. In some embodiments, the processor 110 may include a plurality of I2S interfaces. The processor 110 may be coupled to the audio module 170 by using the I2S interface, to implement communication between the processor 110 and the audio module 170. In some embodiments, the audio module 170 may transmit an audio signal to the wireless communication module 160 by using the I2S interface, to implement a function of answering a call by using a Bluetooth headset.

The PCM interface may also be used for audio communication, to sample, quantize, and encode an analog signal. In some embodiments, the audio module 170 may be coupled to the wireless communication module 160 by using the PCM interface. The audio module 170 may transmit, by using the wireless communication module 160, obtained downlink audio stream data and obtained uplink audio stream data to an electronic device wirelessly connected to the electronic device.

In some embodiments, the audio module 170 may also transmit an audio signal to the wireless communication module 160 by using the PCM interface, to implement the function of answering a call by using the Bluetooth headset. Both the I2S interface and the PCM interface may be used for audio communication.

The UART interface is a universal serial data bus used for asynchronous communication. The bus may be a bidirectional communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using the UART interface, to implement a Bluetooth function. In some embodiments, the audio module 170 may transfer an audio signal to the wireless communication module 160 by using the UART interface, to implement a function of obtaining downlink audio stream data by using an electronic device connected through Bluetooth.

The MIPI interface may be configured to connect the processor 110 to peripheral components such as the display screen 194 and the camera 193. The MIPI interface includes a camera serial interface (Camera Serial Interface, CSI), a display serial interface (Display Serial Interface, DSI), and the like. In some embodiments, the processor 110 and the camera 193 communicate with each other by using the CSI interface, to implement a photographing function of the electronic device 100. The processor 110 communicates with the display screen 194 by using the DSI interface, to implement a display function of the electronic device.

It can be understood that the interface connection relationship between the modules illustrated in this embodiment of this application is merely an example for description, and does not constitute a limitation on the structure of the electronic device. In some other embodiments of this application, the electronic device may alternatively use an interface connection manner different from that in the foregoing embodiment, or use a combination of a plurality of interface connection manners.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may be further multiplexed to increase antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the first electronic device. In some embodiments, the mobile communication module 150 may implement transmission of call data between two electronic devices. For example, when the electronic device serves as a called party device, downlink audio stream data from a calling party device may be obtained, and uplink audio stream data may be transmitted to the calling party device.

The wireless communication module 160 may provide a solution to wireless communication applied to the electronic device, for example, a wireless local area network (Wireless Local Area Networks, WLAN) (for example, a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), near field communication (Near Field Communication, NFC), and an infrared (infrared, IR) technology.

In some embodiments, the antenna 1 and the mobile communication module 150 in the electronic device are coupled, and the antenna 2 and the wireless communication module 160 are coupled, so that the electronic device can communicate with a network and another device by using a wireless communication technology. In an embodiment of this application, the electronic device may implement a local area network connection to another electronic device by using the wireless communication module 160. The wireless communication technology may include a global system for mobile communications (Global System for Mobile Communications, GSM), a general packet radio service (General Packet Radio Service, GPRS), code division multiple access (Code Division Multiple Access, CDMA), wideband code division multiple access (Wideband Code Division Multiple Access, WCDMA), time division-synchronous code division multiple access (Time-Division-Synchronous Code Division Multiple Access, TD-SCDMA), long term evolution (Long Term Evolution, LTE), BT, a GNSS, a WLAN, NFC, FM, an IR technology, and/or the like. The GNSS may include a global positioning system (Global Positioning System, GPS), a global navigation satellite system (Global Navigation Satellite System, GLONASS), a BeiDou navigation satellite system (Beidou Navigation Satellite System, BDS), a quasi-zenith satellite system (Quasi-Zenith Satellite System, QZSS), a satellite based augmentation system (Satellite Based Augmentation System, SBAS), and/or the like.

The display screen 194 is configured to display an image, a video, and the like. The display screen 194 includes a display panel. The display panel may be a liquid crystal display (Liquid Crystal Display, LCD), an organic light-emitting diode (Organic Light-Emitting Diode, OLED), an active-matrix organic light-emitting diode (Active-Matrix Organic Light Emitting Diode, AMOLED), a flexible light-emitting diode (Flex Light-Emitting Diode, FLED), a Mini-LED, a MicroLED, a Micro-OLED, a quantum dot light emitting diode (Quantum dot Light Emitting Diode, QLED), and the like. In some embodiments, the electronic device may include one or N display screens 194, where N is a positive integer greater than 1.

In some embodiments, the display screen 194 may display an incoming call prompt interface, an incoming call conflict prompt interface, an outgoing call failure prompt interface, and an outgoing call interface, so that a user learns of status information of a call conflict and the like based on interface content displayed on the display screen.

The external memory interface 120 may be configured to be connected to an external memory card, for example, a Micro secure digital (Secure Digital Memory, SD) card, to expand a storage capacity of the electronic device. The external memory card communicates with the processor 110 by using the external memory interface 120, to implement a data storage function, for example, to store files such as music, a video, and a recording file in the external memory card.

The internal memory 121 may be configured to store computer-executable program code, and the executable program code includes instructions. The internal memory 121 may include a program storage area and a data storage area. The program storage area may store an operating system, an application (for example, a sound playback function, an image playback function, and a recording function) required by at least one function, and the like. The data storage area may store data (for example, uplink audio data, downlink audio data, and a phone book) and the like created during use of the electronic device. In addition, the internal memory 121 may include a high-speed random access memory, and may further include a non-volatile memory, for example, at least one magnetic disk storage device, a flash memory device, or a universal flash storage (Universal Flash Storage, UFS). The processor 110 performs various function applications and data processing of the electronic device by running the instructions stored in the internal memory 121 and/or the instructions stored in the memory disposed in the processor 110.

The electronic device may implement a call conflict processing function by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio signal into a digital audio signal for input. The audio module 170 may be further configured to encode and decode an audio signal. In some embodiments, the audio module 170 may be disposed in the processor 110, or some functional modules of the audio module 170 may be disposed in the processor 110.

The receiver 170B, also referred to as an "earpiece", is configured to convert an audio electrical signal into a sound signal. When the electronic device answers a call or receives a voice message, the electronic device may hear, by using the receiver 170B, voice transmitted by the calling party device.

The microphone 170C, also referred to as a "mic" or "mike", is configured to convert a sound signal into an audio electrical signal. When making a call or sending voice information, the user may make a sound by approaching the mouth to the microphone 170C, to input a sound signal to the microphone 170C, so as to collect uplink audio stream data.

The pressure sensor 180A is configured to sense a pressure signal, and may convert the pressure signal into an electrical signal. In some embodiments, the pressure sensor 180A may be disposed on the display screen 194. In some embodiments, when the user presses the answer key on the display screen 194, a manual call answer function may be implemented. When the user presses the hang-up key on the display screen 194, a manual call hang-up function may be implemented.

The touch sensor 180K is also referred to as a "touch component". The touch sensor 180K may be disposed on the display screen 194. The touch sensor 180K and the display screen 194 form a touchscreen, also referred to as a "touch control screen". The touch sensor 180K is configured to detect a touch operation performed on or near the touch sensor 180K. The touch sensor 180K may transmit the detected touch operation to the application processor, to determine a type of a touch event, and provide a visual output related to the touch operation by using the display screen 194. In some other embodiments, the touch sensor 180K may alternatively be disposed on a surface of the electronic device at a position different from that of the display screen 194.

The motor 191 may generate a vibration prompt. The motor 191 may be configured to provide a vibration prompt for an incoming call, and may also be configured to provide vibration feedback for touch. For example, after an incoming signal is received, the motor 191 generates a vibration to prompt the user that a call needs to be answered.

Figure 2B:
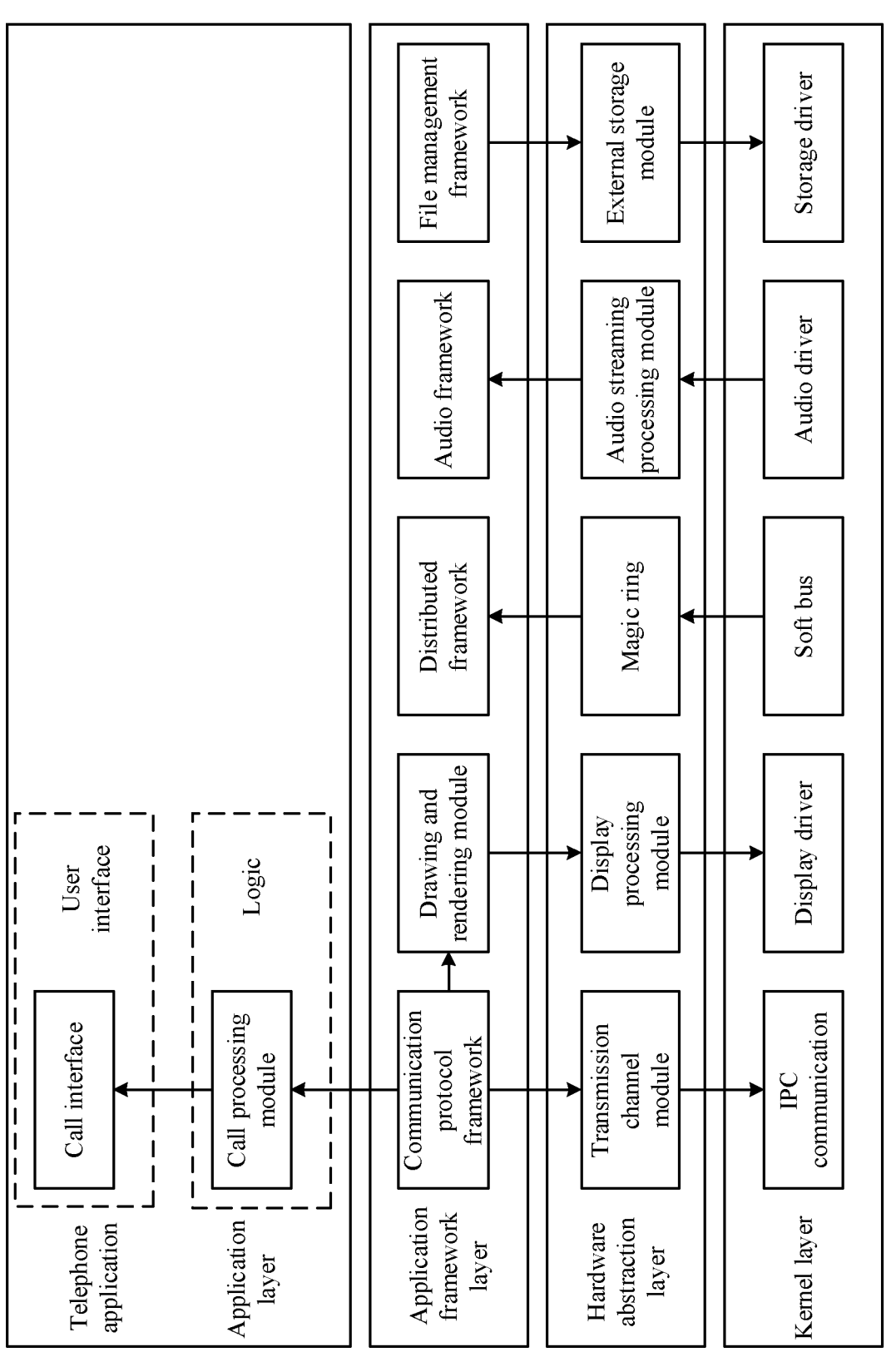
FIG. 2B is a block diagram of a software structure of an electronic device according to an embodiment of this application.

FIG. 2B is a block diagram of a software structure of an electronic device according to an embodiment of this application.

In a layered architecture, software is divided into several layers, and each layer has a clear role and task. The layers communicate with each other by using software interfaces. In some embodiments, the Android system is divided into four layers: an application layer, an application framework layer, an Android runtime (Android Runtime) and system library, and a kernel layer from top to bottom. In some embodiments, the Android system is divided into five layers: an application layer, an application framework layer, an Android runtime (Android Runtime) and system library, a hardware abstraction layer, and a kernel layer from top to bottom. FIG. 2B is merely described by using an example in which the layered architecture includes an application layer, an application framework layer, a hardware abstraction layer, and a kernel layer. This is not limited.

The application layer may include a series of application packages.

As shown in FIG. 2B, the application layer may include a call application and the like. In addition, in some embodiments, the application layer may further include applications such as a Camera, Gallery, Calendar, Phone, Map, Navigation, WLAN, Bluetooth, Music, Video, Messages, and Recorder.

In some embodiments, the user may obtain a call interface during a call by using the call application, and implement a logical operation of a call process.

The application framework layer provides an application programming interface (Application Programming Interface, API) and a programming framework for applications at the application layer. The application framework layer includes some predefined functions.

As shown in FIG. 2B, the application framework layer may include a communication protocol framework, a drawing and rendering module, a distributed framework, an audio framework, a file management framework, and the like.

The communication protocol framework belongs to a part of a telephone manager, configured to provide a communication function for the electronic device, for example, management of a call status (including answering and hanging up).

The drawing and rendering module belongs to a part of a video system, including visual controls such as a text display control and a picture display control. The video system may be configured to create an application. A display interface may include one or more views. For example, an incoming call conflict prompt interface in a call process may include a text display view and a picture display view.

The distributed framework is configured to implement data synchronization between devices in a local area network, for example, synchronize an incoming call signal, so that two devices in the local area network implement incoming call co-vibration, and synchronize a recording file.

The audio framework may belong to a content provider, configured to store and obtain data, and enable the data to be accessed by an application. The data may include videos, images, audio, calls made and answered, and the like.

The file management framework belongs to a part of a resource manager, configured to provide various resources for an application, such as a localized character string, an icon, a picture, a layout file, a recording file, and a video file.

The Android Runtime includes a kernel library and a virtual machine. The Android Runtime is responsible for scheduling and management of the Android system.

The kernel library includes two parts: One part is a functional function that needs to be invoked by a java language, and the other part is a kernel library of the Android system.

The application layer and the application framework layer are run in the virtual machine. The virtual machine executes java files at the application layer and the application framework layer as binary files. The virtual machine is configured to perform functions such as lifecycle management of an object, stack management, thread management, security and exception management, and garbage collection.

The hardware abstraction layer is an interface layer between an operating system kernel and a hardware circuit, and is configured to abstract hardware to provide a virtual hardware platform for the operating system.

As shown in FIG. 2B, the hardware abstraction layer may include a transmission channel module, a display processing module, a magic ring, an audio stream processing module, an external storage module, and the like.

Security of the system, memory management, process management, a network protocol stack, and a driver model all depend on the kernel layer. The kernel layer may include at least an inter process communication (Inter Process Communication, IPC), a display driver, a soft bus, an audio driver, a storage driver, and the like.

The following describes examples of working processes of software and hardware of the electronic device with reference to the software structure in FIG. 2B.

When the mobile communication module 150 receives an incoming call signal, the kernel layer processes the signal into an incoming call event, the application framework layer obtains the incoming call event by using the transmission channel module of the hardware layer, and the application layer obtains the incoming call event by invoking the communication protocol framework, and starts a telephone application. In addition, the kernel layer starts the display screen 194 by using the display driver, to display, on the display screen 194, a call interface corresponding to the telephone application layer program. The user may answer a call or hang up a call by using an answer key or a hang-up key in the call interface.

In an embodiment of this application, the electronic device may communicate with an electronic device A by using a local area network. After a call is received, an incoming call event is synchronized, by using the distributed framework, to an electronic device connected to the electronic device, for example, the electronic device A, so that the two electronic devices implement incoming call co-vibration.

Figure 3:
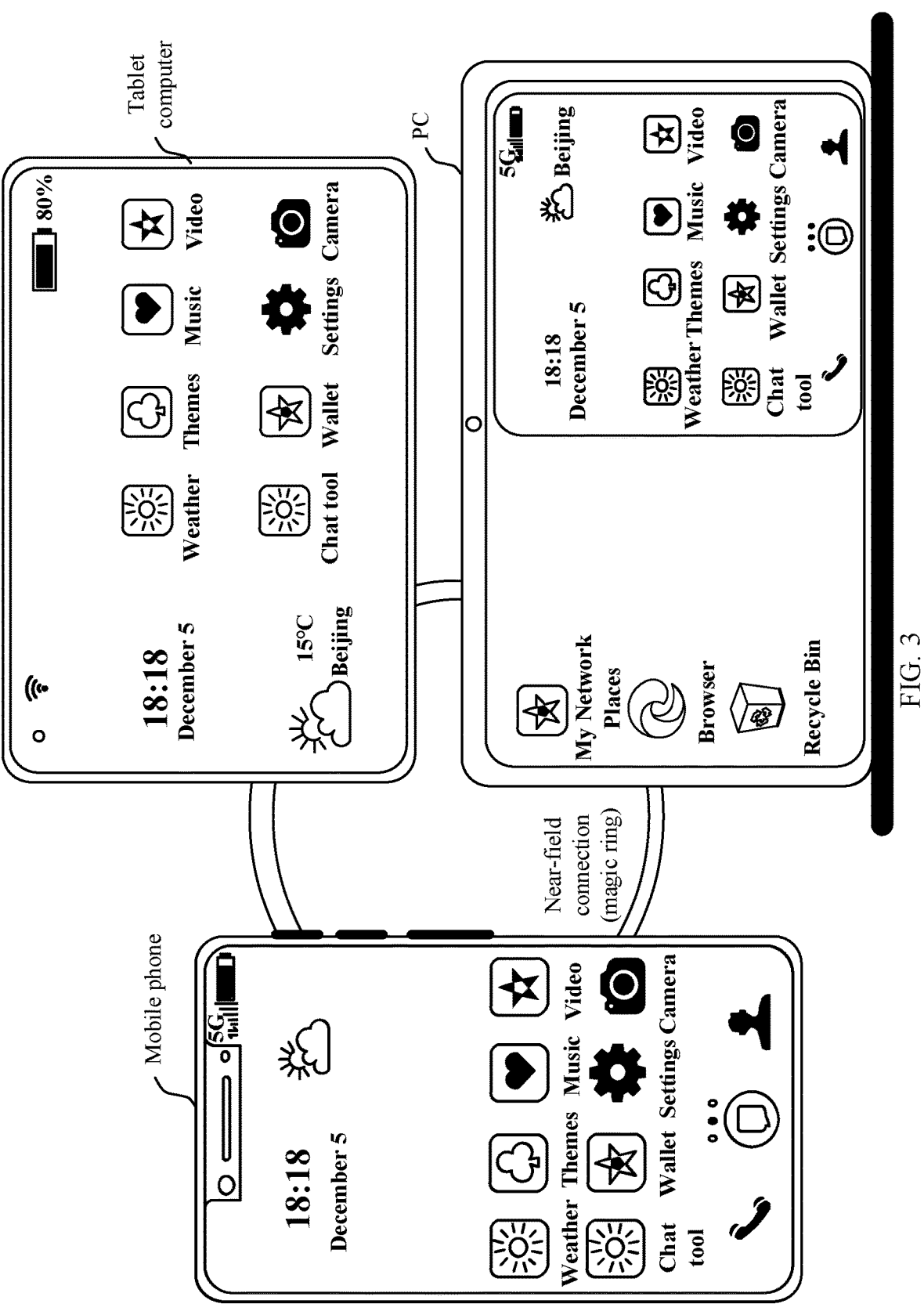
FIG. 3 is a scenario diagram of a magic ring according to an embodiment of this application.

In this embodiment of this application, a mobile phone, a tablet computer, and a PC may be three electronic devices associated based on a magic ring. As shown in FIG. 3, for example, the mobile phone, the tablet computer, and the PC are separately logged in to by using an Honor account, a trust relationship is established based on the Honor account, and execution of the distributed call conflict processing method is considered based on the established trust relationship, to improve call security of the user.

In this embodiment of this application, from a perspective of a call conflict, two major scenarios may be included, and the two major scenarios are respectively a scenario in which a call conflict exists when the mobile phone answers an incoming call and a scenario in which a call conflict exists when the tablet computer answers an incoming call. The scenario in which a call conflict exists when the mobile phone answers an incoming call further includes the scenarios 1-5 shown in Table 1, and the scenario in which a call conflict exists when the tablet computer answers an incoming call further includes the scenarios 6-10 shown in Table 1.

The following describes in detail the distributed call conflict processing method in the embodiments of this application with reference to the two scenarios.

Scenario 1: The scenario in which a call conflict exists when the mobile phone answers an incoming call.

FIG. 4A1, FIG. 4A(2)(a), and FIG. 4A(2)(b) are interaction flowcharts of a distributed call conflict processing method in a scenario according to an embodiment of this application. The method is applied to a system including a mobile phone, a tablet computer, and a PC. The mobile phone and the tablet computer are used as an example. As shown in FIG. 4A1, FIG. 4A(2)(a), and FIG. 4A(2)(b), the mobile phone, the tablet computer, and the PC (not shown) are included. The mobile phone includes a display screen 41, a native call service module 42, a distributed framework 43, and a near-field service module 44. The tablet computer includes a near-field service module 51, a distributed framework 52, and a display screen 53. The distributed framework may also be referred to as a distributed call service module. As shown in FIG. 4A1, FIG. 4A(2)(a), and FIG. 4A(2)(b), the flowcharts include S401-S412.

S401: The mobile phone, the tablet computer, and the PC are near-field connected.

The mobile phone, the tablet computer, and the PC are connected to same Wi-Fi. The mobile phone and the tablet computer are as an example. As shown in FIG. 4A1, FIG. 4A(2)(*a*), and FIG. 4A(2)(*b*), the mobile phone and the tablet computer establish a near-field connection to each other by using a near-field service discovery protocol and the near-field service module 44 and the near-field service module 51, respectively. Similarly, the mobile phone and the PC establish a near-field connection to each other, and the PC and the tablet computer establish a near-field connection to each other.

In this embodiment of this application, the mobile phone, the tablet computer, and the PC may be on a magic ring, to improve information security. In this embodiment of this application, the mobile phone, the tablet computer, and the PC may also be connected to same Wi-Fi by using a same account, and when a distance is less than a specified distance, a near-field connection is established. This is not limited.

In this embodiment of this application, the mobile phone may be connected to one or N SIM cards by using the SIM card interface 195 in FIG. 2A, for example, connected to a SIM card 1 by using the SIM card interface 195. A remote device delivers an incoming call signal for the SIM card 1. The mobile phone may obtain the incoming call signal for the SIM card 1 by using the mobile communication module 150 in FIG. 2A, and enable the native call service module 42 (for example, the kernel layer) to generate an incoming call event for the SIM card 1, and then enable the distributed framework 43 to obtain the incoming call event for the SIM card 1. The distributed framework 43 synchronizes the incoming call event to the distributed framework 52 of the tablet computer by using the near-field service module 44 and the near-field service module 51, so that the mobile phone and the tablet computer can simultaneously output a prompt of the incoming call event, such as a ring, a vibration, and an interface prompt.

After the mobile phone and the tablet computer can simultaneously output the prompt of the incoming call event, the mobile phone answers the incoming call event, so that the mobile phone communicates with the remote device by using the SIM card 1. In this case, the mobile phone records a status identifier of the SIM card 1 as a first identifier, and records a status identifier of the mobile phone as a second identifier, where the first identifier indicates that the SIM card 1 is occupied, and the second identifier indicates that the mobile phone is occupied. When the status identifier of the SIM card 1 is the first identifier, the SIM card 1 is in a call state.

S402: Another remote device delivers an incoming call signal for the SIM card 1, and the mobile phone obtains the incoming call signal. The remote device may be a server, a mobile phone, or the like.

In this embodiment of this application, in the foregoing scenario 1 and scenario 3, the mobile phone may obtain the incoming call signal for the SIM card 1 by using the mobile communication module 150 in FIG. 2A, and enable the native call service module 42 to generate an incoming call event for the SIM card 1.

S403: The mobile phone outputs a prompt of an incoming call conflict.

If the native call service module 42 of the mobile phone detects that the status identifier of the SIM card 1 is the first identifier, and the status identifier of the mobile phone is the second identifier, that is, the mobile phone establishes a call connection to the another remote device by using the SIM card 1, the mobile phone may determine that a call conflict exists, outputs the prompt of the incoming call conflict by using the display screen 41, for example, starts an incoming call interface and rings, and does not notify the distributed framework 43, that is, does not notify the tablet computer and the PC. In this case, the tablet computer and the PC do not have an incoming call notification.

FIG. 4B1 shows an example of an incoming call conflict prompt interface of a mobile phone. In FIG. 4B1, (1) is a call interface of the mobile phone. In this case, if the mobile phone further receives an incoming call, an incoming call conflict occurs. In FIG. 4B1, (2) is an incoming call conflict prompt interface of the mobile phone. For a process of outputting the prompt of the incoming call conflict, refer to S402-S403. Based on the prompt that is of the incoming call conflict and that is output in FIG. 4B1, the user may answer or hang up the new incoming call. If the user answers the new incoming call and holds an old incoming call, the call interface of the mobile phone is shown in FIG. 4B2.

When the mobile phone answers an incoming call, it indicates that the user focuses on the mobile phone side, so that a prompt of an incoming call conflict is output by using the mobile phone, and the tablet computer is not notified. This can effectively remind the user of the incoming call conflict, reduce impact on use of the tablet computer, and improve user experience.

S404: The tablet computer sends an outgoing call event for the SIM card 1 to the mobile phone.

In the foregoing scenario 2, the user enters a phone number into the tablet computer on the tablet computer, and makes a call by using the SIM card 1. Based on the operation in which the user makes a call, the distributed framework 52 of the tablet computer generates the outgoing call event for the SIM card 1, and displays an outgoing call interface by using the display screen 53, to prompt the user that an outgoing call is a distributed outgoing call. In addition, the distributed framework 52 sends the outgoing call event to the distributed framework 43 by using the near-field service module 51 and the near-field service module 44.

S405: The mobile phone obtains status information of the SIM card 1, and feeds back the status information of the SIM card 1 to the tablet computer.

The distributed framework 43 sends the outgoing call event to the native call service module 42, obtains the status information (for example, the foregoing first identifier, indicating that the SIM card 1 is in a call state) of the SIM card 1 by invoking the native call service module 42, and feeds back the status information of the SIM card 1 to the distributed framework 52 by using the near-field service module 51 and the near-field service module 44.

S406: The tablet computer closes the outgoing call interface and outputs a prompt of outgoing call failure.

The distributed frame 52 closes the outgoing call interface displayed on the display screen 53, and controls the display screen 53 to output an outgoing call failure prompt interface.

Figure 4C:
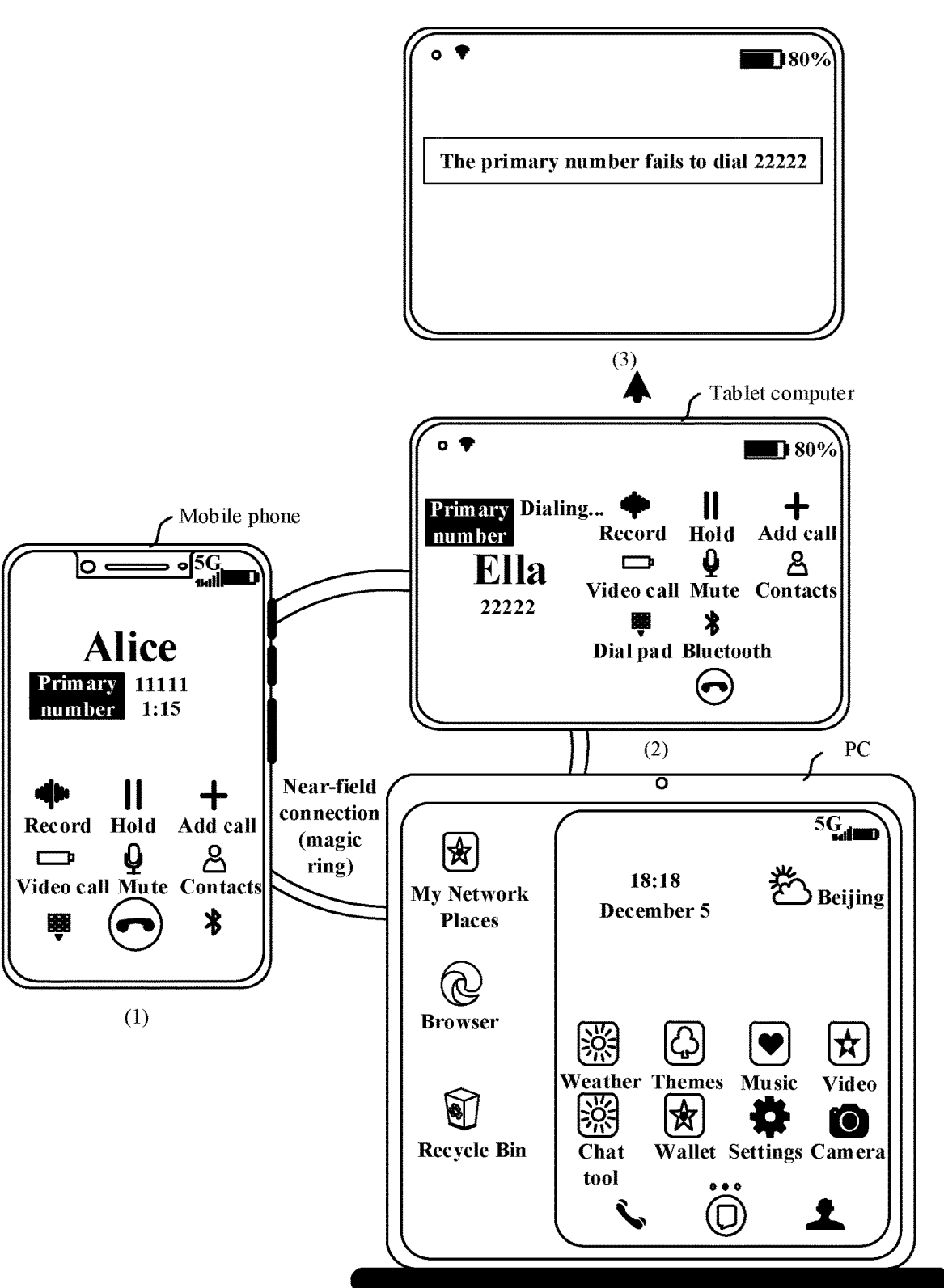

FIG. 4C shows an example of an outgoing call failure prompt interface of a tablet computer. In FIG. 4C, (1) is a call interface of the mobile phone. In this case, if the tablet computer makes a call, an outgoing call interface of the tablet computer is shown in (2) in FIG. 4C. When it is determined that an outgoing call conflict exists, the tablet computer closes the outgoing call interface, and displays an outgoing call failure prompt interface shown in (3) in FIG. 4C. For a process of outputting the prompt of the outgoing call conflict, refer to descriptions in S404-S406.

When the mobile phone answers an incoming call, if the tablet computer makes a call, there is a problem of an outgoing call conflict, and the tablet computer outputs a prompt of outgoing call failure, thereby avoiding ineffective waiting of a user of the tablet computer, also avoiding impact on a call on the mobile phone side, and improving user experience.

S407: Another remote device delivers an incoming call signal for a SIM card 2, and the mobile phone obtains the incoming call signal. Then, if the mobile phone supports a dual-call function, S408 is performed. If the mobile phone does not support a dual-call function, S409 is performed.

In this embodiment of this application, the mobile phone may be connected to one or N SIM cards by using the SIM card interface 195 in FIG. 2A, for example, connected to SIM card 1 and the SIM card 2 by using the SIM card interface 195.

In the foregoing scenario 4, the mobile phone may obtain the incoming call signal for the SIM card 2 by using the mobile communication module 150 in FIG. 2A, and enable the native call service module 42 to generate an incoming call event for the SIM card 2.

S408: The mobile phone outputs a prompt of an incoming call conflict.

If the native call service module 42 of the mobile phone detects that the mobile phone establishes a call connection to the another remote device by using the SIM card 1, the mobile phone may determine that a call conflict exists, outputs the prompt of the incoming call conflict by using the display screen 41, for example, starts an incoming call interface and rings, and does not notify the distributed framework 43, that is, does not notify the tablet computer and the PC. In this case, the tablet computer and the PC do not have an incoming call notification, for example, as shown in FIG. 4B1.

When the mobile phone answers an incoming call, it indicates that the user focuses on the mobile phone side, so that a prompt of an incoming call conflict is output by using the mobile phone, and the tablet computer is not notified. This can effectively remind the user of the incoming call conflict, reduce impact on use of the tablet computer, and improve user experience.

S409: The mobile phone sends data of the SIM card 2 to the tablet computer, and sends the incoming call event for the SIM card 2 to the tablet computer. The tablet computer has a modulation and demodulation function.

Because the mobile phone does not support the dual-call function, the mobile phone cannot implement a function of outputting a prompt of an incoming call conflict. If the native call service module 42 of the mobile phone detects that the mobile phone establishes a call connection to the another remote device by using the SIM card 1, the mobile phone may determine that a call conflict exists, and sends the data of the SIM card 2 to the distributed framework 43. The distributed framework 43 feeds back the data of the SIM card 2 and the incoming call event for the SIM card 2 to the distributed framework 52 of the tablet computer by using the near-field service module 51 and the near-field service module 44.

In this case, the distributed framework 52 is registered with an operator network based on the data of the SIM card 2 and by using an idle SIM card slot, so that the tablet computer has a call capability of the SIM card 2.

In addition, the display screen 41 of the mobile phone does not start an incoming call interface, that is, no prompt is displayed in the call interface, a new incoming call notification of the user is displayed in a status bar, and a missed call log is generated.

S410: The tablet computer outputs a prompt of an incoming call conflict.

The distributed framework 52 of the tablet computer controls the display screen 53 to output an incoming call conflict prompt interface.

FIG. 4D1 shows an example of an incoming call conflict prompt interface of a tablet computer, such as outputting pop-up window information of a new incoming call. In FIG. 4D1, (1) and (2) are respectively a call interface of the mobile phone and an original interface of the tablet computer. In this case, the mobile phone further receives an incoming call. The interfaces of the mobile phone and the tablet computer after call conflict processing are shown in (3) and (4) in FIG. 4D1. In this embodiment of this application, the interface of the tablet computer after call conflict processing may also output the prompt of the incoming call conflict in a manner of pop-up window information, as shown in FIG. 4D2. For a process of outputting the prompt of the incoming call conflict, refer to descriptions in S407 and S409-S410.

When the mobile phone answers an incoming call, it indicates that the user focuses on the mobile phone side. However, the mobile phone does not support the dual-call function. In this case, the tablet computer outputs a prompt of an incoming call conflict, to prompt the user. In addition, no prompt is displayed in a call interface of the mobile phone, a new incoming call notification of the user is displayed in a status bar, and a missed call log is generated, so that the user notices, in a timely manner, an incoming call that causes a call conflict, thereby improving user experience.

S411: The mobile phone sends data of a SIM card 2 to the tablet computer. The tablet computer has a modulation and demodulation function.

In this embodiment of this application, after answering a call by using the SIM card 1, the mobile phone may perform step S411 to send the data of the SIM card 2 to the tablet computer, or may send the data of the SIM card 2 to the tablet computer after the tablet computer makes a call. This is not limited.

S412: The tablet computer sends an outgoing call event for the SIM card 2 to the remote device.

In the foregoing scenario 5, the tablet computer is registered with an operator network based on the data of the SIM card 2. It may be understood that a native call service module is generated on the tablet computer. The native call service module of the tablet computer directly sends the outgoing call event for the SIM card 2 to the remote device, and starts an outgoing call interface, to prompt the user to make an outgoing call. This outgoing call is not a distributed outgoing call.

Figure 4E:
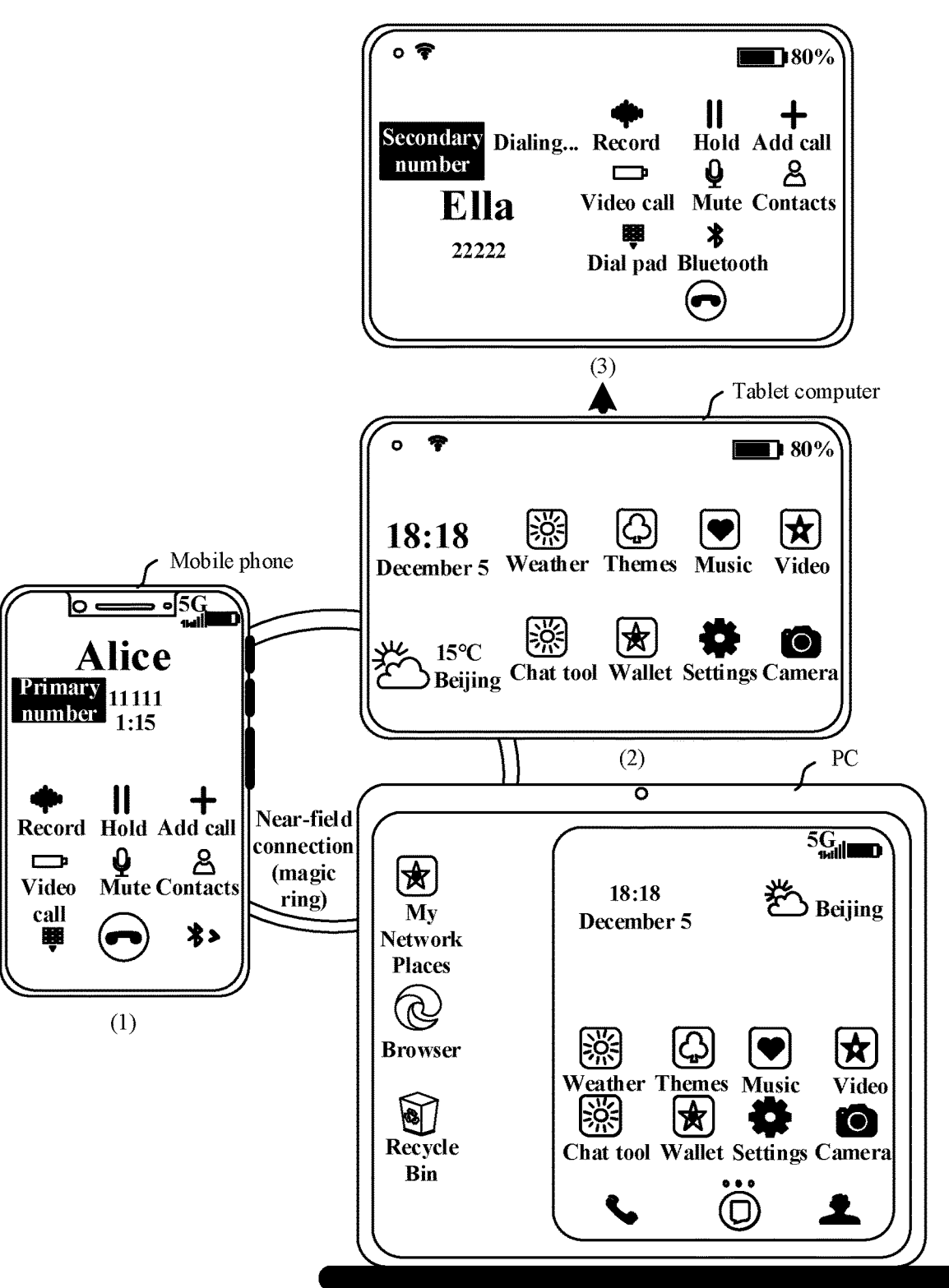

FIG. 4E shows an example of an outgoing call interface of a tablet computer. In FIG. 4E, (1) and (2) are respectively a call interface of the mobile phone and an original interface of the tablet computer. In this case, the tablet computer makes a call. The interface of the mobile phone after call conflict processing remains unchanged, as shown in (1) in FIG. 4E. The interface of the tablet computer after call conflict processing is shown in (3) in FIG. 4E. For a process of outputting the prompt of the incoming call conflict, refer to descriptions in S411-412.

When answering an incoming call by using one SIM card, the mobile phone may send data of the other SIM card to the tablet computer, so that the user can communicate with the remote device by using the other SIM card, to meet a call requirement of the user to a maximum extent and improve user experience.

Scenario 2: The scenario in which a call conflict exists when the tablet computer answers an incoming call.

FIG. 5A1, FIG. 5A(2)(a), and FIG. 5A(2)(b) are interaction flowcharts of a distributed call conflict processing method in a scenario according to an embodiment of this application. The method is applied to a system including a mobile phone, a tablet computer, and a PC. As shown in FIG. 5A1, FIG. 5A(2)(a), and FIG. 5A(2)(b), the mobile phone, the tablet computer, and the PC are included. The mobile phone includes a display screen 41, a native call service module 42, a distributed framework 43, and a near-field service module 44. The tablet computer/PC includes a near-field service module 51, a distributed framework 52, and a display screen 53. The distributed framework may also be referred to as a distributed call service module. As shown in FIG. 5A1, FIG. 5A(2)(a), and FIG. 5A(2)(b), the flow-charts include S501-S512.

S501: The mobile phone, the tablet computer, and the PC are near-field connected.

The mobile phone, the tablet computer, and the PC are connected to same Wi-Fi. The mobile phone and the tablet computer are as an example. As shown in FIG. 5A1, FIG. 5A(2)(a), and FIG. 5A(2)(b), the mobile phone and the tablet computer establish a near-field connection by using a near-field service discovery protocol and the near-field service module 44 and the near-field service module 51, respectively. Similarly, the mobile phone and the PC establish a near-field connection, and the PC and the tablet computer establish a near-field connection.

In this embodiment of this application, after the mobile phone and the tablet computer can simultaneously output a prompt of an incoming call event for a SIM card 1, the tablet computer answers the incoming call event, so that the tablet computer can communicate with a remote device by using the SIM card 1. In this case, the tablet computer sends event information of the answered the incoming call event to the mobile phone. Based on the received event information, the mobile phone records a status identifier of the SIM card 1 as a first identifier, and records a status identifier of the tablet computer as a third identifier, where the first identifier indicates that the SIM card 1 is occupied, and the third identifier indicates that the tablet computer is occupied.

S502: Another remote device delivers an incoming call signal for the SIM card 1, and the mobile phone obtains the incoming call signal. The remote device may be a server, a mobile phone, or the like.

In this embodiment of this application, in the foregoing scenario 6 and scenario 8, the mobile phone may obtain the incoming call signal for the SIM card 1 by using the mobile communication module 150 in FIG. 2A, and enable the native call service module 42 to generate an incoming call event for the SIM card 1.

S503: The mobile phone sends the incoming call event for the SIM card 1 to the tablet computer.

Optionally, the native call service module 42 of the mobile phone does not detect that the mobile phone establishes a call connection to the another remote device by using the SIM card 1, sends the incoming call event for the SIM card 1 to the distributed framework 43, and does not start an incoming call interface. If the distributed framework 43 detects that the status identifier of the SIM card 1 is the first identifier, and the status identifier of the tablet computer is the third identifier, that is, the tablet computer establishes a call connection to the another remote device by using the SIM card 1, the distributed framework synchronizes the incoming call event to the distributed framework 52 of the tablet computer by using the near-field service module 44 and the near-field service module 51, and does not notify the PC of the incoming call event.

Optionally, the native call service module 42 of the mobile phone detects that the status identifier of the SIM card 1 is the first identifier, and the status identifier of the tablet computer is the third identifier, that is, the tablet computer establishes a call connection to the another remote device by using the SIM card 1, sends the incoming call event for the SIM card 1 to the distributed framework 43, and does not start the incoming call interface. The distributed framework 43 synchronizes the incoming call event to the distributed framework 52 of the tablet computer by using the near-field service module 44 and the near-field service module 51, and does not notify the PC of the incoming call event.

S504: The tablet computer outputs a prompt of an incoming call conflict.

If the distributed framework 52 of the tablet computer detects that the tablet computer establishes a call connection to the another remote device by using the SIM card 1, the tablet computer may determine that a call conflict exists, and outputs the prompt of the incoming call conflict by using the display screen 53, for example, starts an incoming call interface and rings, to remind the user of the distributed incoming call conflict.

FIG. 5B1 shows an example of an incoming call conflict prompt interface of a tablet computer. In FIG. 5B1, (1) is a call interface of the tablet computer. In this case, if the tablet computer further receives an incoming call, an incoming call conflict occurs. In FIG. 5B1, (2) is an incoming call conflict prompt interface of the tablet computer. For a process of outputting the prompt of the incoming call conflict, refer to S502-S504. Based on the prompt that is of the incoming call conflict and that is output in FIG. 5B1, the user may answer or hang up the new incoming call. If the user answers the new incoming call and holds an old incoming call, the call interface of the tablet computer is shown in FIG. 5B2.

When the tablet computer answers an incoming call, it indicates that the user focuses on the tablet computer side, so that a prompt of an incoming call conflict is output by using the tablet computer, and the PC is not notified. This can effectively remind the user of the incoming call conflict, reduce impact on use of the PC, and improve user experience.

S505: The PC sends an outgoing call event for the SIM card 1 to the mobile phone.

In the foregoing scenario 7, the user enters a phone number into the PC on the PC, and makes a call by using the SIM card 1. Based on the operation in which the user makes a call, the distributed framework of the PC generates the outgoing call event for the SIM card 1, and displays an outgoing call interface by using the display screen of the PC. In addition, the distributed framework of the PC sends the outgoing call event to the distributed framework 43 of the mobile phone by using the near-field service module of the PC and the near-field service module 44. For details, refer to the foregoing descriptions in step S404.

S506: The mobile phone obtains status information of the SIM card 1, and feeds back the status information of the SIM card 1 to the PC.

The distributed framework 43 sends the outgoing call event to the native call service module 42, obtains the status information (for example, the foregoing first identifier, indicating that the SIM card 1 is in a call state) of the SIM card 1 by invoking the native call service module 42, and feeds back the status information of the SIM card 1 to the distributed framework of the PC by using the near-field service module of the PC and the near-field service module 44.

S507: The PC closes the outgoing call interface, and outputs a prompt of outgoing call failure.

The distributed framework of the PC closes the outgoing call interface displayed on the display screen of the PC, and controls the display screen of the PC to output an outgoing call failure prompt interface.

Figure 5C:
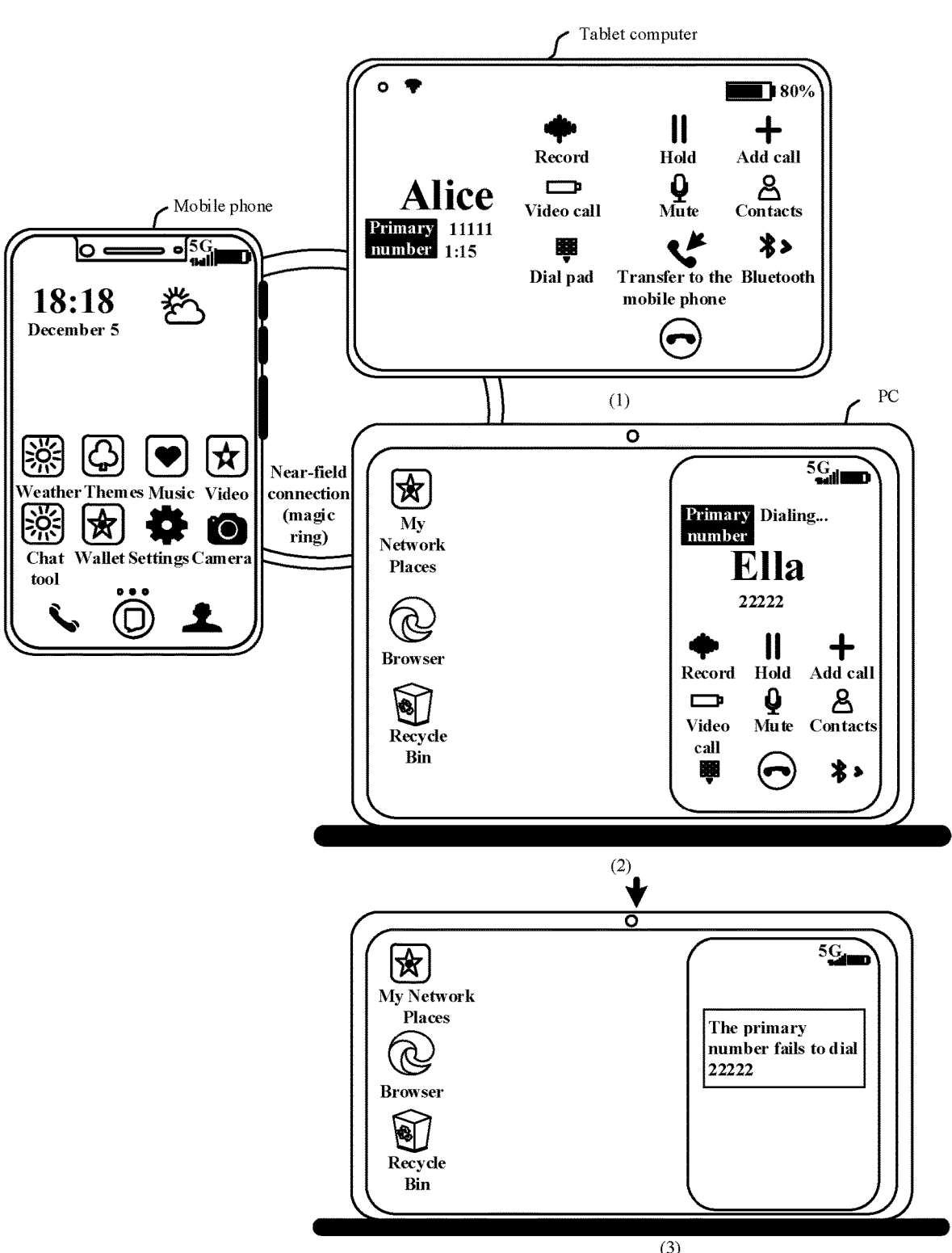

FIG. 5C shows an example of an outgoing call failure prompt interface of a PC. In FIG. 5C, (1) is a call interface of the tablet computer. In this case, if the PC makes a call, an outgoing call interface of the PC is shown in (2) in FIG. 5C. When it is determined that an outgoing call conflict exists, the PC closes the outgoing call interface, and displays an outgoing call failure prompt interface shown in (3) in FIG. 5C. For a process of outputting the prompt of the outgoing call conflict, refer to descriptions in S505-S507.

When the tablet computer answers an incoming call, if the PC makes a call, there is a problem of an outgoing call conflict, and the PC outputs a prompt of outgoing call failure, thereby avoiding ineffective waiting of a user of the PC side, also avoiding impact on a call on the tablet computer side, and improving user experience.

S508: Another remote device delivers an incoming call signal for a SIM card 2, and the mobile phone obtains the incoming call signal.

In this embodiment of this application, the mobile phone may be connected to one or N SIM cards by using the SIM card interface 195 in FIG. 2A, for example, connected to the SIM card 1 and the SIM card 2 by using the SIM card interface 195.

In the foregoing scenario 9, the mobile phone may obtain the incoming call signal for the SIM card 2 by using the mobile communication module 150 in FIG. 2A, and enable the native call service module 42 to generate an incoming call event for the SIM card 2.

S509: The mobile phone sends data of the SIM card 2 to the PC, and sends the incoming call event for the SIM card 2 to the PC. The PC has a modulation and demodulation function.

Optionally, the native call service module 42 of the mobile phone does not detect that the mobile phone establishes a call connection to the another remote device, and sends the incoming call event for the SIM card 2 to the distributed framework 43. The distributed framework 43 detects that the tablet computer establishes a call connection to the remote device by using the SIM card 1, obtains the data of the SIM card 2, and feeds back the data of the SIM card 2 and the incoming call event for the SIM card 2 to the distributed framework of the PC by using the near-field service module of the PC and the near field service module 44.

Optionally, the native call service module 42 of the mobile phone detects that the tablet computer establishes a call connection to the remote device by using the SIM card 1, and sends the incoming call event for the SIM card 2 to the distributed framework 43. The distributed framework 43 obtains the data of the SIM card 2, and feeds back the data of the SIM card 2 and the incoming call event for the SIM card 2 to the distributed framework of the PC.

In this embodiment of this application, the distributed framework 43 may directly obtain the data of the SIM card 2 from the SIM card 2, or the native call service module 42 may obtain the data of the SIM card 2 from the SIM card 2, and send the obtained data of the SIM card 2 to the distributed framework 43. This is not limited.

In this case, the distributed framework of the PC is registered with an operator network based on the data of the SIM card 2 and by using an idle SIM card slot, so that the PC has a call capability of the SIM card 2.

In addition, the display screen 41 of the mobile phone does not start an incoming call interface, that is, no prompt is displayed in the call interface, a new incoming call notification of the user is displayed in a status bar, and a missed call log is generated.

S510: The PC outputs a prompt of an incoming call conflict.

The distributed framework of the PC controls the display screen of the PC to output an incoming call conflict prompt interface.

FIG. 5D1 shows an example of an incoming call conflict prompt interface of a PC. In FIG. 5D1, (1), (2), and (3) are respectively a call interface of the tablet computer, an original interface of the PC, and an original interface of the mobile phone. In this case, the mobile phone further receives an incoming call. The interfaces of the mobile phone and the PC after call conflict processing are shown in (4) and (5) in FIG. 5D1. In this embodiment of this application, the interface of the tablet computer after call conflict processing may also output the prompt of the incoming call conflict in a manner of pop-up window information, as shown in FIG. 5D2. For a process of outputting the prompt of the incoming call conflict, refer to descriptions in S508-S510.

When the tablet computer answers an incoming call, it indicates that the user focuses on the tablet computer side. In this case, the PC outputs a prompt of an incoming call conflict, to prompt the user. In addition, no prompt is displayed in a call interface of the mobile phone, a new incoming call notification of the user is displayed in a status bar, and a missed call log is generated, so that the user notices, in a timely manner, an incoming call that causes a call conflict, thereby improving user experience.

S511: The mobile phone sends data of a SIM card 2 to the PC. The PC has a modulation and demodulation function.

In this embodiment of this application, after answering a call by using the SIM card 1, the mobile phone may perform step S511 to send the data of the SIM card 2 to the PC, or may send the data of the SIM card 2 to the PC after the PC makes a call. This is not limited.

S512: The PC sends an outgoing call event for the SIM card 2 to the remote device.

In the foregoing scenario 10, the PC is registered with an operator network based on the data of the SIM card 2. It may be understood that a native call service module is generated on the tablet computer. The native call service module of the PC directly sends the outgoing call event for the SIM card 2 to the remote device, and establishes a call connection to the remote device.

Figure 5E:
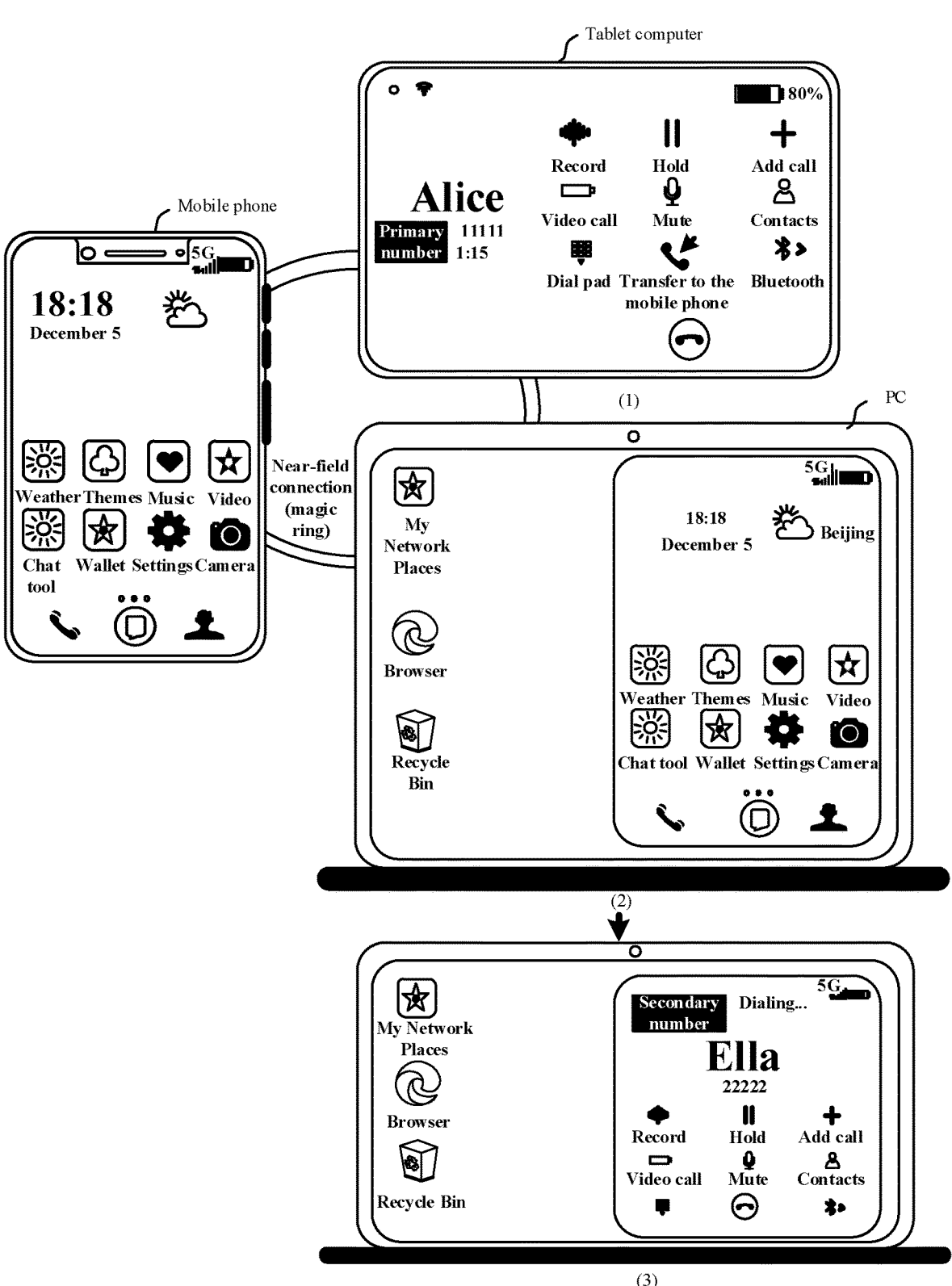

FIG. 5E shows an example of an outgoing call interface of a PC. In FIG. 5E, (1) and (2) are respectively a call interface of the tablet computer and an original interface of the PC. In this case, the PC makes a call. The interface of the tablet computer after call conflict processing remains unchanged, as shown in (1) in FIG. 5E. The interface of the PC after call conflict processing is shown in (3) in FIG. 5E. For a process of outputting the prompt of the incoming call conflict, refer to descriptions in S511-512.

When answering an incoming call by using one SIM card, the tablet computer may send data of the other SIM card to the PC, so that the user can communicate with the remote device by using the other SIM card, to meet a call requirement of the user to a maximum extent and improve user experience.

Figures 6, 7:
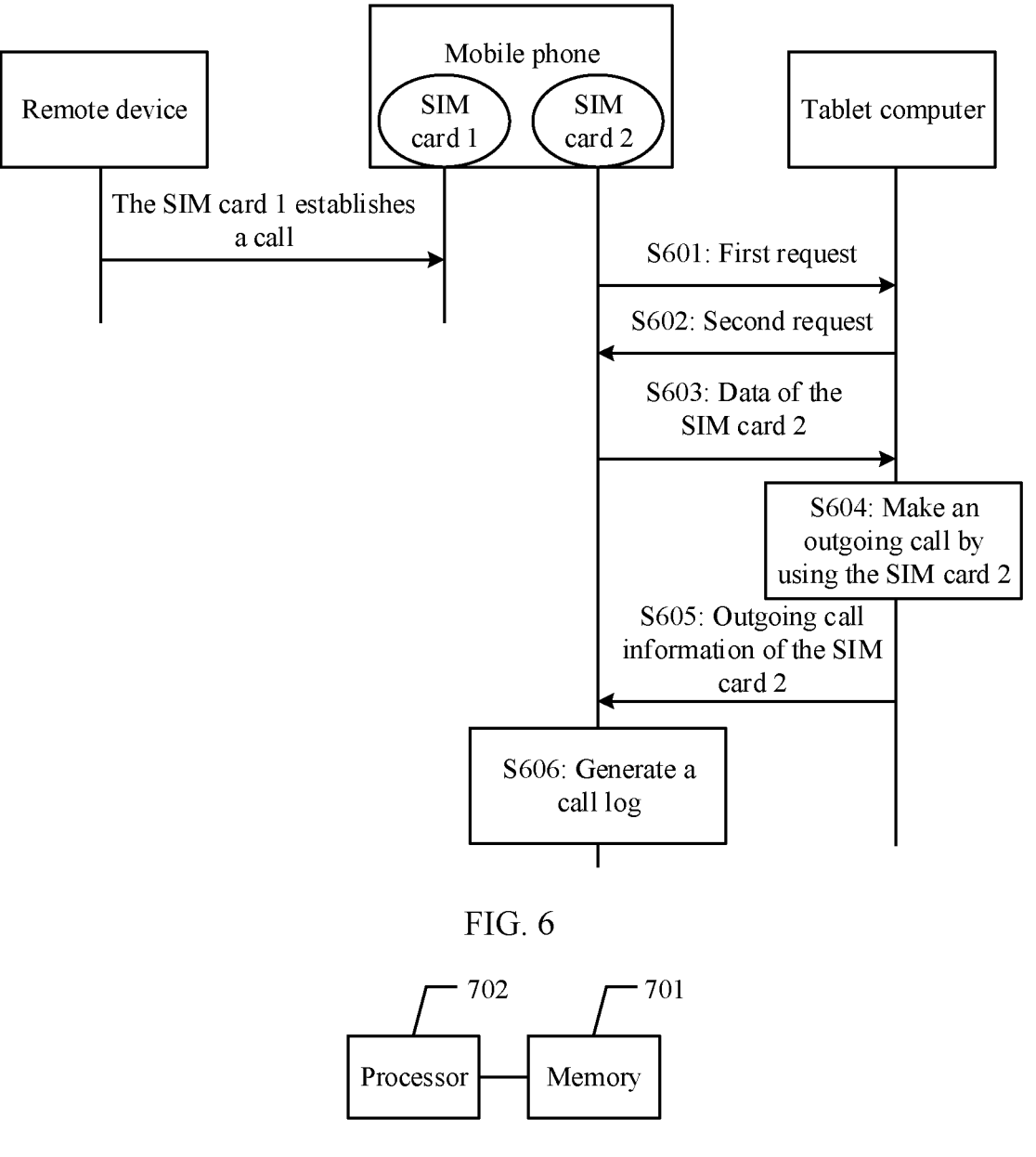
FIG. 6 is a schematic flowchart of obtaining data of a second SIM card by a second electronic device according to an embodiment of this application.
FIG. 7 is a schematic diagram of a structure of an electronic device according to an embodiment of this application.

In some embodiments, an embodiment of this application further provides a schematic flowchart of obtaining data of a second SIM card (SIM card 2) by a second electronic device (such as a tablet computer). As shown in FIG. 6, the flowchart includes S601-S606.

S601: A mobile phone sends a first request to the tablet computer, where the first request is used to obtain a status of a modulation and demodulation function.

In this embodiment of this application, after the mobile phone or a PC establishes a call connection to a remote device by using a SIM card 1, the mobile phone sends, to the tablet computer, the request, namely, the first request, for obtaining the status of the modulation and demodulation function.

S602: The tablet computer detects that the modulation and demodulation function is in an available state, and sends a second request to the mobile phone, where the second request is used to obtain data of a SIM card 2.

S603: The mobile phone sends the data of the SIM card 2 to the tablet computer based on the second request.

The tablet computer is registered with an operator network based on the data of the SIM card 2 and by using an idle SIM card slot, so that the tablet computer has a call capability of the SIM card 2. In this case, the tablet computer may establish a call connection to the remote device by using the call capability of the SIM card 2.

S604: The tablet computer makes an outgoing call by using the call capability of the SIM card 2.

The tablet computer may establish a call connection to the remote device by using the call capability of the SIM card 2, to communicate with the device.

S605: The tablet computer synchronizes outgoing call information of the SIM card 2 to the mobile phone.

S606: The mobile phone generates a call log for the SIM card 2 based on the outgoing call information.

In this embodiment of this application, the user uses the mobile phone more frequently than the tablet computer, and synchronizes the outgoing call information of the SIM card 2 to the mobile phone, to generate the call log, so as to remind the user of the outgoing call information in a timely manner, and improve user experience.

The process for obtaining the data of the SIM card 2 provided in this embodiment of this application is applicable to obtaining the data of the SIM card 2 in the foregoing scenario 4, scenario 5, scenario 9, and scenario 10. Details are not described herein again.

Referring to FIG. 7, an embodiment of this application further provides an electronic device, including:

a memory 701, configured to store instructions to be executed by one or more processors of the device; and a processor 702, configured to perform the method explained with reference to FIG. 4A1, FIG. 4A(2)(a) and FIG. 4A(2)(b), FIG. 5A1, and FIG. 5A(2)(a) and FIG. 5A(2)(b) in the foregoing embodiments.

An embodiment of this application further provides a computer-readable storage medium. The computer-readable storage medium stores a computer program. When the computer program is run by an electronic device, a processor is enabled to perform the method explained in FIG. 4A1, FIG. 4A(2)(a) and FIG. 4A(2)(b), FIG. 5A1, and FIG. 5A(2)(a) and FIG. 5A(2)(b) in the foregoing embodiments.

An embodiment of this application further provides a computer program product including instructions. When the computer program product runs on an electronic device, a processor is enabled to perform the method shown in FIG. 4A1, FIG. 4A(2)(a) and FIG. 4A(2)(b), FIG. 5A1, and FIG. 5A(2)(a) and FIG. 5A(2)(b) in the foregoing embodiments.

Figures 8, 9:
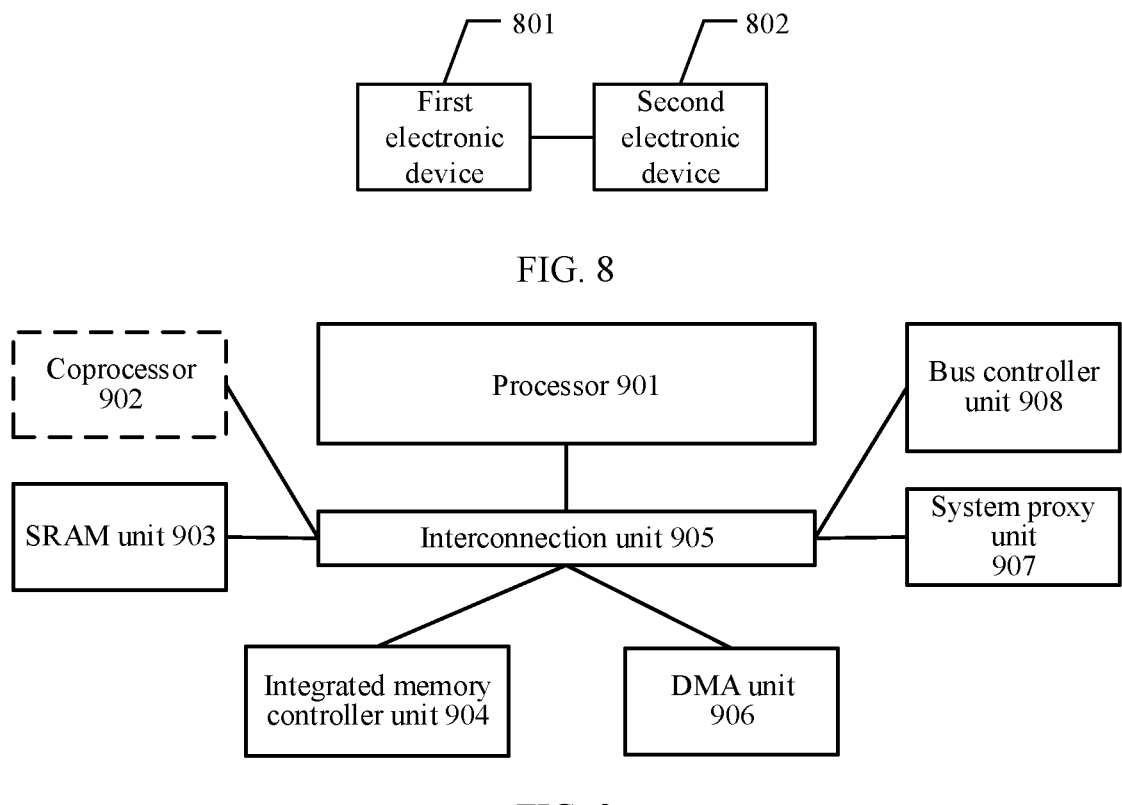
FIG. 8 is a schematic diagram of a structure of a distributed call conflict processing system according to an embodiment of this application.
FIG. 9 is a schematic diagram of a structure of a system on chip according to an embodiment of this application.

An embodiment of this application further provides a distributed call conflict processing system. As shown in FIG. 8, the system includes:

a first electronic device 801, configured to perform the method performed by the first electronic device in FIG. 4A1, FIG. 4A(2)(a) and FIG. 4A(2)(b), FIG. 5A1, and FIG. 5A(2)(a) and FIG. 5A(2)(b) in the foregoing embodiments; and a second electronic device 802, configured to perform the method performed by the second electronic device in FIG. 4A1, FIG. 4A(2)(a) and FIG. 4A(2)(b), FIG. 5A1, and FIG. 5A(2)(a) and FIG. 5A(2)(b) in the foregoing embodiments.

FIG. 9 is a block diagram of an SoC (System on Chip, system on chip) according to an embodiment of this application. In FIG. 9, similar components have a same reference numeral. In addition, a dashed-line box is an optional feature of a more advanced SoC. In FIG. 9, the SoC includes: an interconnection unit 905, coupled to an application processor 901; a system proxy unit 907; a bus controller unit 908; an integrated memory controller unit 904; a group of or one or more coprocessors 902, where the processor may include integrated graphics logic, an image processor, an audio processor, and a video processor; a static random access memory (Static Random Access Memory, SRAM) unit 903; and a direct memory access (Direct Memory Access, DMA) unit 906. In an embodiment, the coprocessor 902 includes a dedicated processor, such as a network or communication processor, a compression engine, a general-purpose computing on graphics processing unit (General-Purpose computing on Graphics Processing Units, GPGPU), a high-throughput many integrated core (Many Integrated Core, MIC) processor, or an embedded processor.

The SRAM unit 903 may include one or more computer-readable media configured to store data and/or instructions. The computer-readable storage medium may store instructions, and specifically store temporary and permanent copies of the instructions. The instructions may include the following: When the instructions are executed by at least one unit in the processor, the SoC is enabled to perform the distributed call conflict processing method in the foregoing embodiments. For details, refer to the methods explained in FIG. 4A1, FIG. 4A(2)(a) and FIG. 4A(2)(b), FIG. 5A1, and FIG. 5A(2)(a) and FIG. 5A(2)(b) in the foregoing embodiments. Details are not described herein again.

Embodiments of mechanisms disclosed in this application may be implemented by using hardware, software, firmware, or a combination of these implementation methods. The embodiments of this application may be implemented as a computer program or program code executed on a programmable system. The programmable system includes at least one processor, a storage system (including a volatile memory and a non-volatile memory and/or a storage element), at least one input device, and at least one output device.

The program code may be applied to an input instruction to perform various functions described in this application and generate output information. The output information may be applied to one or more output devices in a known manner. For the purpose of this application, the processing system includes any system having a processor such as a digital signal processor (Digital Signal Processor, DSP), a microcontroller, an application-specific integrated circuit (Application Specific Integrated Circuit, ASIC), or a microprocessor.

The program code may be implemented by using a high-level programming language or an object-oriented programming language, to communicate with the processing system. When required, the program code may also be implemented by using an assembly language or a machine language. In fact, the mechanisms described in this application are not limited to a scope of any specific programming language. In any scenario, the language may be a compilation language or an interpretation language.

In some cases, the disclosed embodiments may be implemented by using hardware, firmware, software, or any combination thereof. The disclosed embodiments may be further implemented as instructions carried or stored on one or more transitory or non-transitory machine-readable (for example, computer-readable) storage media, and the instructions may be read and executed by one or more processors. For example, the instructions may be distributed by using a network or another computer-readable storage medium. Therefore, the machine-readable storage medium may include any mechanism used to store or transmit information in a machine (for example, computer) readable form, including but not limited to a floppy disk, an optical disc, a compact disc read-only memory (Compact Disc Read Only Memory, CD-ROMs), a magneto-optical disk, a read-only memory (Read Only Memory, ROM), a random access memory (RAM), an erasable programmable read-only memory (Erasable Programmable Read Only Memory, EPROM), an electrically erasable programmable read-only memory (Electrically Erasable Programmable Read Only Memory, EEPROM), a magnetic card or an optical card, a flash memory, or a tangible machine-readable memory configured to transmit information (such as a carrier, an infrared signal, and a digital signal) via the Internet in electrical, optical, or acoustic form or another form of propagation signal. Therefore, the machine-readable storage medium includes any type of machine-readable storage medium suitable for storing or transmitting electronic instructions or information in the machine (for example, computer) readable form.

In the accompanying drawings, some structure or method features may be shown in a particular arrangement and/or order. However, it should be understood that such specific arrangement and/or sorting may not be required. Instead, in some embodiments, these features may be described in a manner and/or order different from that shown in the accompanying drawings of the specification. In addition, inclusion of the structure or method features in a particular figure does not imply that all embodiments need to include the features. In some embodiments, these features may not be included, or these features may be combined with other features.

It should be noted that all the units/modules mentioned in the device embodiments of this application are logical units/modules. Physically, a logical unit/module may be a physical unit/module, or may be a part of a physical unit/module, or may be implemented as a combination of a plurality of physical units/modules. Physical implementations of these logical units/modules are not most important, and only a combination of functions implemented by these logical units/modules is a key to resolving the technical problem proposed in this application. In addition, to highlight the innovative part of this application, in the foregoing device embodiments of this application, units/modules that are not closely related to resolving the technical problem proposed in this application are not introduced. This does not mean that no other units/modules exist in the foregoing device embodiments.

It should be noted that in the examples and specification of this patent, relational terms such as first and second are only used to distinguish one entity or operation from another entity or operation, and do not necessarily require or imply that there is any such actual relationship or order between these entities or operations. In addition, the term "include", "comprise", or any other variant thereof is intended to cover non-exclusive inclusion, so that a process, method, article, or device that includes a series of elements includes not only those elements but also other elements that are not expressly listed, or includes elements inherent to such a process, method, article, or device. Without further limitation, the element defined by the sentence "including a" does not exclude that other identical elements also exist in the process, method, article, or device including the element.

Although this application has been illustrated or described with reference to some preferred embodiments of this application, a person of ordinary skill in the art should understand that various modifications may be made to forms and details without departing from the spirit and scope of this application.

What is claimed is:

1. A method, comprising:

receiving, by a first electronic device having a first subscriber identity module (SIM) card, an incoming call event from a calling party, and obtaining an incoming call SIM card identifier in the incoming call event;

sending, by the first electronic device, the incoming call event to a second electronic device if a SIM card indicated by the incoming call SIM card identifier is the first SIM card, a status identifier of the first SIM card indicates that the first SIM card is occupied, and a status identifier of the second electronic device indicates that the second electronic device is occupied, wherein the first electronic device is near-field connected to the second electronic device; and outputting, by the second electronic device, a prompt of an incoming call conflict.

2. The method of claim 1, wherein if the SIM card indicated by the incoming call SIM card identifier is the first SIM card, the status identifier of the first SIM card indicates that the first SIM card is occupied, and a status identifier of the first electronic device indicates that the first electronic device is occupied, the method further comprises outputting, by the first electronic device, a prompt of an incoming call conflict.

3. The method of claim 1, wherein the first electronic device further has a second SIM card, wherein if the SIM card indicated by the incoming call SIM card identifier is the second SIM card, the status identifier of the first SIM card indicates that the first SIM card is occupied, and the status identifier of the second electronic device indicates that the second electronic device is occupied, the method further comprises sending, by the first electronic device, data of the second SIM card to a third electronic device, and sending the incoming call event to the third electronic device, wherein the third electronic device has a modulation and demodulation function, and wherein the method comprises outputting, by the third electronic device, an incoming call prompt based on the data of the second SIM card.

4. The method of claim 1, wherein the first electronic device further has a second SIM card, and wherein if the SIM card indicated by the incoming call SIM card identifier is the second SIM card, the status identifier of the first SIM card indicates that the first SIM card is occupied, and a status identifier of the first electronic device indicates that the first electronic device is occupied, the method further comprises outputting, by the first electronic device, a prompt of an incoming call conflict.

5. The method of claim 1, wherein the second electronic device has a modulation and demodulation function, and the first electronic device further has a second SIM card, wherein if the SIM card indicated by the incoming call SIM card identifier is the second SIM card, the status identifier of the first SIM card indicates that the first SIM card is occupied, and a status identifier of the first electronic device indicates that the first electronic device is occupied, the method further comprises sending, by the first electronic device, data of the second SIM card to the second electronic device, and sending the incoming call event to the second electronic device, and wherein the method comprises outputting, by the second electronic device, an incoming call prompt based on the data of the second SIM card.

6. The method of claim 5, wherein if the SIM card indicated by the incoming call SIM card identifier is the second SIM card, and the status identifier of the first SIM card indicates that the first SIM card is occupied, the method further comprises displaying, by the first electronic device, a new incoming call notification in a status bar, and generating a missed call log for the incoming call event.

7. The method of claim 1, further comprising:

sending, by the second electronic device, an outgoing call event to the first electronic device;

receiving, by the first electronic device, the outgoing call event, and obtaining an outgoing call SIM card identifier in the outgoing call event;

sending, by the first electronic device, status information to the second electronic device if a SIM card indicated by the outgoing call SIM card identifier is the first SIM card, and the status identifier of the first SIM card indicates that the first SIM card is occupied, wherein the status information comprises the first SIM card being in a call state; and outputting, by the second electronic device, a prompt of outgoing call failure based on the status information.

8. The method of claim 1, wherein the second electronic device has a modulation and demodulation function, the first electronic device further has a second SIM card, and the method further comprises:

sending, by the first electronic device, data of the second SIM card to the second electronic device; and sending, by the second electronic device, an outgoing call event to another device based on the data of the second SIM card.

9. The method of claim 8, further comprising:

sending, by the second electronic device, outgoing call information of the outgoing call event to the first electronic device; and generating, by the first electronic device, a call log for the second SIM card based on the outgoing call information.

10. The method of claim 1, wherein the first electronic device comprises a first distributed framework, and the second electronic device comprises a second distributed framework, and wherein the first electronic device communicates with the second distributed framework of the second electronic device by the first distributed framework, so that the first electronic device and the second electronic device synchronously receive the incoming call event of the calling party.

11. A method, comprising:

receiving, by a first electronic device having a first subscriber identity module (SIM) card, an incoming call event from a calling party, and obtaining an incoming call SIM card identifier in the incoming call event; and sending the incoming call event to a second electronic device if a SIM card indicated by the incoming call SIM card identifier is the first SIM card, a status identifier of the first SIM card indicates that the first SIM card is occupied, and a status identifier of the second electronic device indicates that the second electronic device is occupied, so that the second electronic device outputs a prompt of an incoming call conflict.

12. The method of claim 11, wherein if the SIM card indicated by the incoming call SIM card identifier is the first SIM card, the status identifier of the first SIM card indicates that the first SIM card is occupied, and a status identifier of the first electronic device indicates that the first electronic device is occupied, the method further comprises outputting a prompt of an incoming call conflict.

13. The method of claim 11, wherein the first electronic device further has a second SIM card, and wherein if the SIM card indicated by the incoming call SIM card identifier is the second SIM card, the status identifier of the first SIM card indicates that the first SIM card is occupied, and the status identifier of the second electronic device indicates that the second electronic device is occupied, the method further comprises sending data of the second SIM card to a third electronic device, and sending the incoming call event to the third electronic device, so that the third electronic device outputs an incoming call prompt based on the data of the second SIM card, wherein the third electronic device has a modulation and demodulation function.

14. The method of claim 11, wherein the first electronic device further has a second SIM card, and wherein if the SIM card indicated by the incoming call SIM card identifier is the second SIM card, the status identifier of the first SIM card indicates that the first SIM card is occupied, and a status identifier of the first electronic device indicates that the first electronic device is occupied, the method further comprises outputting a prompt of an incoming call conflict.

15. The method of claim 11, wherein the second electronic device has a modulation and demodulation function, and the first electronic device further has a second SIM card, and wherein if the SIM card indicated by the incoming call SIM card identifier is the second SIM card, the status identifier of the first SIM card indicates that the first SIM card is occupied, and a status identifier of the first electronic device indicates that the first electronic device is occupied, the method further comprises sending data of the second SIM card to the second electronic device, and sending the incoming call event to the second electronic device, so that the second electronic device outputs an incoming call prompt based on the data of the second SIM card.

16. The method of claim 15, wherein if the SIM card indicated by the incoming call SIM card identifier is the second SIM card, and the status identifier of the first SIM card indicates that the first SIM card is occupied, the method further comprises displaying a new incoming call notification in a status bar, and generating a missed call log for the incoming call event.

17. A method, comprising:

receiving, by a second electronic device, an incoming call event from a first electronic device having a first subscriber identity module (SIM) card, wherein the incoming call event is an incoming call event received by the first electronic device from a calling party, a SIM card indicated by an incoming call SIM card identifier in the incoming call event is the first SIM card, a status identifier of the first SIM card indicates that the first SIM card is occupied, and a status identifier of the second electronic device indicates that the second electronic device is occupied; and outputting a prompt of an incoming call conflict.

18. The method of claim 17, wherein the second electronic device has a modulation and demodulation function, the first electronic device further has a second SIM card, and the method further comprises:

receiving data of the second SIM card from the first electronic device, and receiving the incoming call event from the first electronic device, wherein the incoming call event is the incoming call event received by the first electronic device from the calling party, the SIM card indicated by the incoming call SIM card identifier in the incoming call event is the second SIM card, the status identifier of the first SIM card indicates that the first SIM card is occupied, and a status identifier of the first electronic device indicates that the first electronic device is occupied; and outputting an incoming call prompt based on the data of the second SIM card.

19. The method of claim 18, further comprising:

sending an outgoing call event to the first electronic device, so that the first electronic device sends status information to the second electronic device when a SIM card indicated by an outgoing call SIM card identifier in the outgoing call event is the first SIM card, and the status identifier of the first SIM card indicates that the first SIM card is occupied, wherein the status information comprises the first SIM card being in a call state; and outputting a prompt of outgoing call failure based on the status information.

20. The method of claim 17, wherein the second electronic device has a modulation and demodulation function, the first electronic device further has a second SIM card, and the method further comprises:

receiving data of the second SIM card from the first electronic device; and sending an outgoing call event to another device based on the data of the second SIM card.

* * * * *